United States Patent
Ogawa et al.

(10) Patent No.: US 9,904,307 B2
(45) Date of Patent: Feb. 27, 2018

(54) CONTROL METHOD FOR DISTRIBUTED AUTONOMOUS SYSTEM AND DISTRIBUTED AUTONOMOUS SYSTEM

(75) Inventors: Masatsugu Ogawa, Tokyo (JP); Atsuhiro Tanaka, Tokyo (JP); Yuma Matsuda, Tokyo (JP); Masafumi Yano, Miyagi (JP)

(73) Assignees: NEC CORPORATION, Tokyo (JP); MASAFUMI YANO, Sendai-shi (JP)

( * ) Notice: Subject to any disclaimer, the term of this patent is extended or adjusted under 35 U.S.C. 154(b) by 1037 days.

(21) Appl. No.: 14/241,936

(22) PCT Filed: Aug. 29, 2012

(86) PCT No.: PCT/JP2012/072531
§ 371 (c)(1),
(2), (4) Date: May 15, 2014

(87) PCT Pub. No.: WO2013/032026
PCT Pub. Date: Mar. 7, 2013

(65) Prior Publication Data
US 2014/0249687 A1 Sep. 4, 2014

(30) Foreign Application Priority Data
Aug. 30, 2011 (JP) .................. 2011-187514

(51) Int. Cl.
*G05F 1/66* (2006.01)
*G06Q 10/06* (2012.01)
(Continued)

(52) U.S. Cl.
CPC .............. *G05F 1/66* (2013.01); *G05B 15/02* (2013.01); *G06Q 10/06* (2013.01); *G06Q 50/06* (2013.01);
(Continued)

(58) Field of Classification Search
CPC ........ G06Q 10/06; G06Q 50/06; Y04S 50/10; H02J 3/008; Y02P 70/161; Y02P 90/205;
(Continued)

(56) References Cited

U.S. PATENT DOCUMENTS 6,519,509 B1 * 2/2003 Nierlich ............... H02J 3/008
700/286
6,681,154 B2 * 1/2004 Nierlich ............... H02J 3/008
323/267
(Continued)

FOREIGN PATENT DOCUMENTS

JP 10-301603 A 11/1998
JP 2001258157 A 9/2001
(Continued)

OTHER PUBLICATIONS

Xia et al. "Design and Evaluation of Event-driven Networked Realtime Control Systems with IEC Function Blocks", 2004 IEEE, pp. 5148-5153.*
(Continued)

*Primary Examiner* — Van Nguyen
(74) *Attorney, Agent, or Firm* — Sughrue Mion, PLLC

(57) ABSTRACT

Provided is a system including a plurality of correlated function blocks, for executing load balancing among the function blocks. The plurality of function blocks each include an activation/shutdown control unit to determine whether to activate/shut down its own function block based on information of an evaluation function of its own function block and information of an evaluation function of another function block that has a relation to its own function block, and the activation/shutdown control unit determines whether to activate/shut down its own function block by using an amount relevant to the evaluation function of its own function block in a state where the evaluation function of its own function block takes a desired value, and using a state of the evaluation function of the another function block having a relation to its own function block that is equivalent to, or related to, the relevant amount.

18 Claims, 23 Drawing Sheets

(51) Int. Cl.
  *G06Q 50/06*  (2012.01)
  *H02J 3/00*  (2006.01)
  *G05B 15/02*  (2006.01)

(52) U.S. Cl.
  CPC .... *H02J 3/008* (2013.01); *G05B 2219/32021* (2013.01); *Y02P 70/161* (2015.11); *Y02P 90/205* (2015.11); *Y04S 50/10* (2013.01)

(58) Field of Classification Search
  CPC .. G05B 15/02; G05B 2219/32021; G05F 1/66
  See application file for complete search history.

(56) References Cited

U.S. PATENT DOCUMENTS

| | | | | |
|---|---|---|---|---|
| 7,088,014 | B2* | 8/2006 | Nierlich | H02J 3/008 307/38 |
| 8,626,353 | B2* | 1/2014 | Ghosh | G06Q 10/04 700/28 |
| 8,639,392 | B2* | 1/2014 | Chassin | G06Q 20/102 700/286 |
| 2007/0250184 | A1* | 10/2007 | Arita | G05B 13/024 700/28 |
| 2012/0185106 | A1* | 7/2012 | Ghosh | G06Q 10/04 700/291 |

FOREIGN PATENT DOCUMENTS

| | | |
|---|---|---|
| JP | 2001-273007 A | 10/2001 |
| JP | 2002-165365 A | 6/2002 |
| JP | 2003-223322 A | 8/2003 |
| JP | 2003-239372 A | 8/2003 |
| JP | 2004-064901 A | 2/2004 |
| JP | 2004-266924 A | 9/2004 |
| JP | 2006-050730 A | 2/2006 |

OTHER PUBLICATIONS

Singh et al. "A Heterogeneous Power Efficient Load Balancing Target-Monitoring Protocol for Sensor Networks", 2010 IEEE, pp. 152-157.*

Kawada, et al., " Development of Operation Plan for Power Generator in Power Supply/Demand Operation", Operations Research as a Management Science, Japan, The Operations Research Society of Japan, May 1, 1997, vol. 42, No. 5, pp. 391-392; 341-344 (6 pages).

Muto, et al., "Combinational Optimization Problems in Power Systems", The Transactions of the Institute of Electrical Engineers of Japan B, Japan, The Institute of Electrical Engineers of Japan, Apr. 20, 1994, vol. 114-B, pp. 331-334 (6 pages).

Communication dated Dec. 7, 2016, from the Japanese Patent Office in counterpart Japanese application No. 2013-531458.

Communication dated Mar. 1, 2017, mailed from the Japanese Patent Office in corresponding application No. 2013-531458.

* cited by examiner

CONTROL METHOD FOR DISTRIBUTED AUTONOMOUS SYSTEM AND DISTRIBUTED AUTONOMOUS SYSTEM

CROSS REFERENCE TO RELATED APPLICATIONS

This application is a National Stage of International Application No. PCT/JP2012/072531, filed on Aug. 29, 2012, which claims priority from Japanese Patent Application No. 2011-187514, filed on Aug. 30, 2011, the contents of all of which are incorporated herein by reference in their entirety.

TECHNICAL FIELD

This invention relates to a system that includes a plurality of function blocks and runs the function blocks by integrating the function blocks in an autonomous decentralized adaptive manner, and to a control method therefor.

BACKGROUND ART

Currently, an increase in system scale and a phenomenon where a field that has not been systematized is suddenly turned into a large-scale system are in progress in various fields. A typical example of the former is found in the IT field such as data centers and networks that are related to a technology called cloud, and the scale thereof is increasing dramatically year after year. An example of the latter is found in the infrastructure field such as electric power, energy networks, and cities, which are becoming targets to be controlled as fields of a smart grid, a smart city, or other large-scale system cases. How large-scale systems are to be controlled is therefore expected to be a very important issue in the near future.

Add to that, the energy-conscious mindset of today's society demands control that does not waste energy by shutting down an idling machine or the like. This is a trend not exclusive to the IT field and the infrastructure field, but shared throughout the society. A generally effective action is, for example, exerting control so as to shut down a control object that is idling.

In the case of electric power grids, though limited electric power plants are controlled in this manner at present, an issue of which power plant is to be activated and which power plant is to be shut down for efficient generation of electricity has been studied for a long time. This is a matter of load balancing and is called a "unit commitment problem". The "unit commitment problem" includes not only the issue of which power plants is to be activated/shut down but also an issue of allocating load optimally among active power plants after determining for each power plant whether to activate or shut down, and an issue of adjusting load in active power plants. This is a comprehensive matter of activation/shutdown and optimal allocation of generation amount and load. A solution method that has been employed is offline scheduling based on a scenario that is scripted as a deterministic mathematical programming model.

If the society steers toward further energy saving, innumerable solar energy sources are expected to be connected to conventional power grids. With solar light energy which fluctuates depending on the goings-on in nature, the conventional method of running power plants by offline scheduling would not work well. As is understood from this prediction, solving the problem means being capable of dealing with a very large number of control objects and dealing with an unexpected external disturbance. Offline scheduling is not good at dealing with an unexpected external disturbance, and a method of solving the "unit commitment problem" in real time for innumerable electric power nodes (on a large scale) will be sought after in the future.

However, a method of solving the "unit commitment problem" in real time is very difficult to think up of and has not been proposed at present. There is also an issue of how to handle a very large number of control objects.

The "unit commitment problem" exists in the IT field as well.

Examples of control exerted in a system of the IT field include load balancing among computer resources, network load balancing, and decentralized storage arrangement, namely, a decentralized control of function blocks. How load balancing among computer resources is controlled is described by taking as an example a load balancing method that is targeted for a data center (DC) including a plurality of servers.

The basic idea of conventional control eventuates in "balancing the internal state of the system", which is rather unsophisticated. With this mindset, while the control policy is clear in the case of a uniform system (where the plurality of servers are identical servers), what index is to be the basis of balancing is not clear in a mixed-machine system where different types of machines are used.

For instance, while it is known that the CPU utilization ratios of the respective servers are to be balanced in the case of servers having the same performance, it is not obvious how to balance the CPU utilization ratios of servers that have different performance characteristics in a manner that reflects the servers' respective performance. A result obtained by the queueing theory, which is an index often used in conventional control, is an index based on the theory of probability, and tells nothing about what means to use in order to lead the system to a stochastically steady state.

What this means is that, although the system may eventually satisfy requirements to be fulfilled such as response and throughput by a control that uses the queueing theory, the system has no guarantees or limitations with regard to processes in the middle and the situation of resources that are ultimately used. In other words, the resultant control is merely for fulfilling the required performance irrespective of whether the system is in a very inefficient state in terms of energy.

Under such control, the inefficiency grows as the system increases in scale, and is expected to be a serious problem. Shutting down a server that is to be shut down and activating a server that is to be activated with accuracy is important here, too, and server load balancing can be considered as a type of the "unit commitment problem".

The "unit commitment problem" is a problem also associated with many control problems such as storage arrangement control.

Examples of technologies related to the system control described above are found in the following patent literatures.

CITATION LIST

Patent Literature

Patent Literature 1: JP-A-H10-301603
Patent Literature 2: JP-A-2001-273007
Patent Literature 3: JP-A-2003-223322

DISCLOSURE OF THE INVENTION

Problem to be Solved by the Invention

As described above, the "unit commitment problem" exists in the infrastructure field, the IT field, and various other fields. A great increase in the scale of control objects is also expected in the future. In addition, a situation where an unexpected external disturbance to the system is a regular occurrence needs to be prepared for. Solving the "unit commitment problem" in real time is important under such circumstance. The method, however, is not established at the moment. A solution method for the issue of controlling a very large number of control objects in real time, successive and concurrently in a centralized manner is not self-evident as well.

The inventors of this invention have devised a method of solving those issues of the "unit commitment problem" in real time by handling control objects of any field as function blocks. This method is a control method capable of handling a very large number of control objects and, in our opinion, promises to be an effective system control method in the future.

This invention provides a system having excellent robustness, following capability, upward/downward scalability, efficiency, and the like with respect to a unit commitment problem in a system that includes a plurality of correlated function blocks as components, and a method of controlling the system.

Means to Solve the Problem

According to one embodiment of this invention, there is provided a system, including a plurality of correlated function blocks, for activating/shutting down the plurality of function blocks and executing load balancing among the plurality of function blocks, in which the plurality of function blocks, which are control objects, each include an activation/shutdown control unit to obtain and to store information of an evaluation function that indicates a performance index of its own function block and information of an evaluation function of another function block that has a relation to its own function block, and to determine whether to activate/shut down its own function block based on the evaluation function of its own function block and the evaluation function of the another function block that has a relation to its own function block, and the activation/shutdown control unit determines whether to activate/shut down its own function block by using an amount relevant to the evaluation function of its own function block in a state where the evaluation function of its own function block takes a desired value, and using a state of the evaluation function of the another function block having a relation to its own function block that is equivalent to, or related to, the relevant amount.

Effect of the Invention

According to this invention, the control method superior to existing control methods for the unit commitment problem in terms of robustness, following capability, upward/downward scalability, efficiency, and the like is provided, as well as the system that uses the control method.

MODE FOR EMBODYING THE INVENTION

An embodiment mode of this invention is described in detail below with reference to the drawings.

A system according to this invention is described first by way of an electric power system. An electric power generator (or power house; electric power generating equipment) corresponds to each function block in this case. In other words, described here is a control method for a unit commitment problem in an electric power system that includes among its components a plurality of correlated function blocks which have different performances. In this description, a power generator capable of actively adjusting the power generation amount and a unit for controlling the power generator constitute a function block, and power generating equipment that passively generates power from solar light or the like is not used. In the case where passive power generating equipment is incorporated in a system that actively generates power, this invention is basically applicable when a block called a power conditioner which controls reverse power flow and other problems is incorporated and exerts control.

Figure 1:
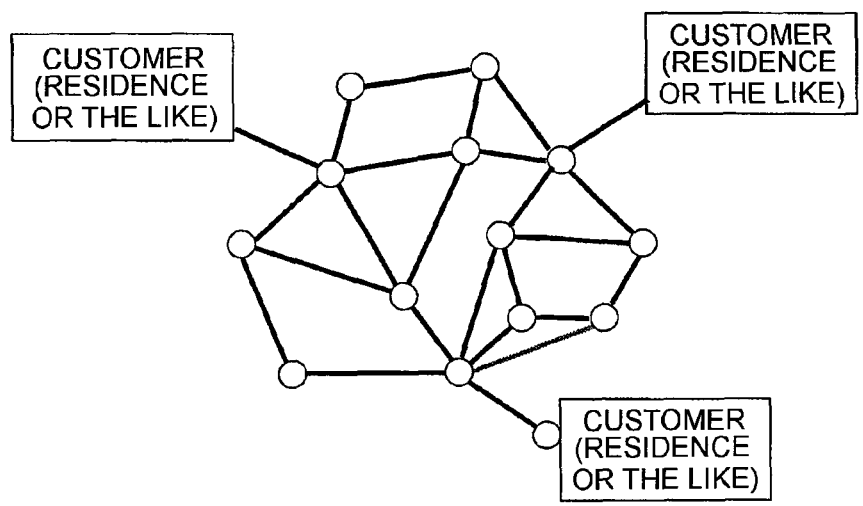
FIG. 1 is a schematic diagram of a system studied in this invention.

Discussed below is an issue of executing wasteless power generation while fulfilling overall demand in an electric power system where a plurality of (N) power generators having different performances form an electric power network. The definition of wasteless power generation includes not only adjusting the power generation amount but also the activation/shutdown of power generators, which constitutes the "unit commitment problem". A system configuration used in the description is illustrated in a schematic diagram of FIG. 1. Circular marks in FIG. 1 represent function blocks.

For this problem, we present a control method that unitarily solves two issues. One of the issues is to determine whether to activate or shut down for each individual function block, and the other issue is to determine the power generation amount for each function block, namely, the allocation of load. Function blocks that are control objects are herein expressed as function blocks, components, resources, nodes, and the like to suit respective actual systems, but the expressions refer to essentially the same thing.

Determining whether to activate or shut down for each function block is an issue of determining which resource out of a group of resources is to be used by the system and which resource is not, or an issue of managing the respective resources. Load arrangement is an issue of how tasks assigned to the overall system are to be allocated to the provided resources in order to accomplish optimization under a certain index. Many existing control methods have attempted to solve these issues individually via a stochastic approach. However, with a control method based on a simple theory of probability, it is difficult to secure robustness depending on the situation in an ever-changing environment and to deal with changes in environment quickly in real time.

Disclosed here is an architecture which integrates these two issues and which is excellent in terms of robustness depending on the situation and real-time following capability. The disclosed method solves the issues unitarily by a deterministic or relational method, instead of a stochastic method.

Figure 2:
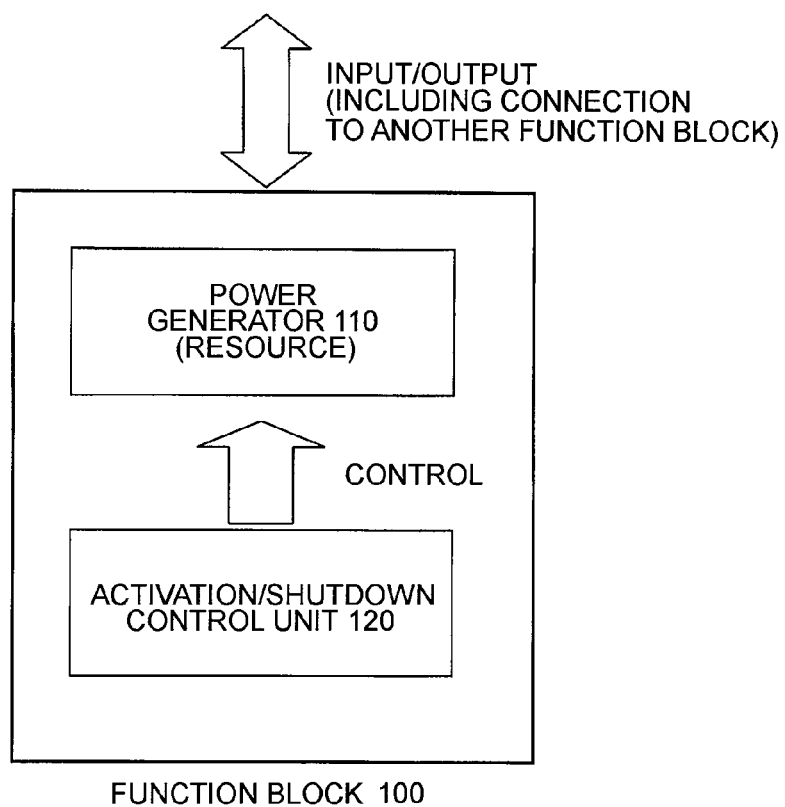
FIG. 2 is a schematic diagram of the architecture of a function block in an embodiment mode of this invention.

FIG. 2 is a block diagram of a function block where this control method is executed.

Each individual function block 100 includes a power generator 110 which is a control object resource, and an activation/shutdown control unit 120 which controls the activation/shutdown and output of the power generator 110. The number of power generators 110 which are resources does not need to be limited to one per function block, and any mode can be employed as long as the power generators 100 are managed as one function block by the activation/shutdown control unit 120.

The activation/shutdown control unit 120 contains a storing unit for storing information about an evaluation function that indicates a performance index of its own function block, and information about an evaluation function of another function block that has a relation with its own function block. An evaluation function indicating a performance index of a function block in this case is an evaluation function indicating a performance index of a power generator.

The activation/shutdown control unit 120 monitors the output state of its own function block (in this case, the output state of the generator) and an output state of another function block that has a relation with its own function block (in this case, the output state of the other generator) at the time, calculates necessary values based on their respective evaluation functions that are stored, and determines load (output) to be allocated to the activation/shutdown of the power generator 110. How the necessary values are calculated is described later.

Each function block 100 is thus set an evaluation function about the function block state that is associated with the function block. The individual function block 100 calculates, as an aspect of activation/shutdown control, a value for balancing worth to be provided to the system based on its own evaluation function and worth (expected) to be provided to the system by another function block that has a relation with itself based on an evaluation function of the other function block. The worth is a value determined based on evaluation functions and is a value among output values supplied from the function block side to the system side. The balanced value determines the supposed output of the power generator 110 of the function block 100.

Along with the supposed output, the function block 100 also performs processing of determining a unitary and good solution for activation/shutdown control based on an evaluation function as described below.

This evaluation function is desirably a convex function.

As worth that the other function block (power generator) provides to the electric power system, the activation/shutdown control unit 120 may also use a calculated value that is calculated from a value obtained from the other function block.

The activation/shutdown control unit 120 may use a state where the evaluation function of its own function block has a value "0" as a reference for determining whether to activate or shut down in activation/shutdown control.

The activation/shutdown control unit 120 uses the gradient state of an evaluation function for activation/shutdown control. A differential value can be used as the gradient state of an evaluation function.

This configuration and operation is employed by each individual function block that constitutes the system.

While the issues of activation/shutdown of the function block 100 and load arrangement are solved unitarily as solid optimization here, solving the issues individually, such as only determining whether to activate or shut down, is of course possible.

In the "unit commitment problem", overall demand needs to be fulfilled by the overall system (in this case, the entirety of networked power generators). Fulfilling the overall demand is called demand-supply balancing, and constitutes a restraint condition. Unless this is fulfilled, there is no sense in maximizing efficiency or profit. The demand in this example is the sum of values of respective operation levels $\lambda_i$ (i represents a function block number, here a number of a power generator), and is expressed by the following Expression 1.

$$Dem = \sum_i \lambda_i \qquad (1)$$

The operation level can be considered as the function block state. The function block state is related to worth to be provided by an individual function block to the system, and can be regarded as the power of power generator in the description given here.

To accomplish demand-supply balancing, the operation level of each component (resource, in this case, function block) is determined with the following Expression 2 as a condition. In other words, the activation/shutdown control unit 120 controls resources for demand-supply balancing so that Expression 2 is satisfied.

$$\frac{d\lambda_i}{dt} = K_1 \cdot \lambda_{nom,i} \frac{Dem - \sum_k \lambda_k}{Dem} \qquad (2)$$

In this expression, the symbol $K_1$ is a coefficient equivalent to a gain of a change in operation level. The symbol $\lambda_{nom,i}$ represents a normalization coefficient of an element i and is not always necessary. However, multiplying by a normalization coefficient overall is often preferred in the case of heterogeneous components, which is why $\lambda_{nom,i}$ is introduced in Expression 2. $\lambda_{nom,i}$ represents an amount equal to a scale of the element (for example, the size of an output capacity). The activation/shutdown control unit controls the operation levels of the respective elements in a manner determined by Expression 2, thereby causing the overall system to operate so as to fulfill Dem, which is the restraint condition.

Figure 3:
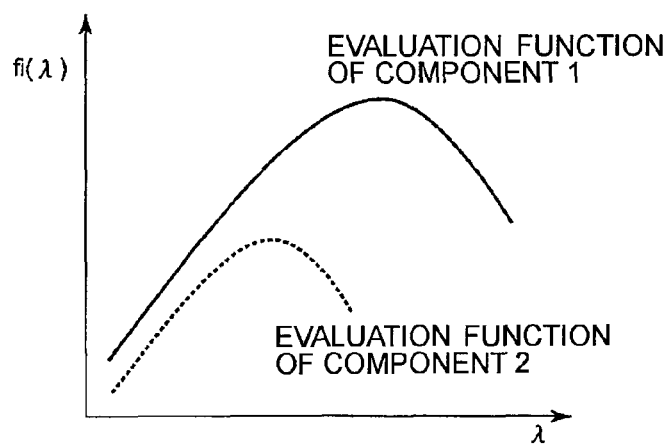
FIG. 3 is a schematic diagram of evaluation functions used in the embodiment mode.

Overall profit maximization which equals load arrangement is discussed next. This can be read as overall efficiency maximization. Overall profit maximization can also be read as the pursuit of profit and worth of the overall system. Here we introduce evaluation functions associated with respective components, such as those illustrated in FIG. 3. The axis of abscissa represents a parameter for controlling each component and, in this example, corresponds to the generated power amount or the like. The axis of ordinate represents an index related to efficiency or profit. This index indicates worth provided to the system.

Examples of the index related to efficiency or profit are described in detail in embodiments. The index is therefore described here as general efficiency. As an evaluation function related to this efficiency, a convex function is used in this embodiment mode. The use of convex functions is another point of the invention of this application. This is because some form of efficiency, system stability, and the like can be expressed by such convex functions as those illustrated in FIG. 3 in many systems. While it is a common practice to call functions that are convexed upward as those in FIG. 3 as concave functions and to call functions that are convexed downward as convex functions, the expression that distinguishes functions by the functions' properties is employed herein, and concave functions, too, are expressed as convex functions.

A problem for accomplishing overall optimization through cooperation between a plurality of components whose evaluation functions are convex functions is known as "convex programming problem". This yields a state where the sum of evaluation function values of a plurality of function blocks (components) is maximum. It has mathematically been proven that, to solve a convex programming problem, optimization is accomplished under a situation where differential values of evaluation functions at the operation levels of the respective components are equal to one another. This principle is applied here, which is the reason why convex functions are used here as evaluation functions.

The inventors of this invention have taken this principle into consideration in writing an equation for accomplishing overall profit maximization as the following Expression 3.

$$\frac{d\lambda_i}{dt} = K_2 \cdot \lambda_{nom,i} \frac{\sum_k \lambda_{nom,k}\left(\frac{df_i}{d\lambda_i} - \frac{df_k}{d\lambda_k}\right)}{\sum_k \lambda_{nom,k}} \qquad (3)$$

Expression 3 can be simplified as Expression 4.

$$\frac{d\lambda_i}{dt} \propto \left(\frac{df_i}{d\lambda_i} - \frac{df_k}{d\lambda_k}\right) \qquad (4)$$

In this expression, the symbol $K_2$ is a coefficient equivalent to a gain of a change in operation level.

The respective function blocks autonomously carry out the control defined by this expression, thereby causing the function blocks to operate in a manner that equalizes differential values of evaluation functions of the overall system at the operation levels. In other words, each function block controls the operation level to a level that maximizes the sum of worth (efficiency, output, or the like) values of the overall system based on a convex function set to itself and a convex function set to another function block that has a relation to itself. This equalizes the following differential value of the evaluation function in each functional block, thereby enabling the system to exert maximum efficiency.

$$\frac{df_i}{d\lambda_i}$$

In order to arrange load optimally while ultimately balancing demand and supply, the demand-supply balancing and overall profit maximization described above need to be solved simultaneously. The operation level of each component is therefore controlled by the following Expression 5 which integrates the two.

$$\frac{d\lambda_i}{dt} = K_1 \cdot \lambda_{nom,i} \frac{Dem - \sum_k \lambda_k}{Dem} + K_2 \cdot \lambda_{nom,i} \frac{\sum_k \lambda_{nom,k}\left(\frac{df_i}{d\lambda_i} - \frac{df_k}{d\lambda_k}\right)}{\sum_k \lambda_{nom,k}} \qquad (5)$$

Executing the operation control described above in each individual function block enables the system to solve the issue of load arrangement in real time.

A description is given next on the activation/shutdown of each function block which is to be executed unitarily with the operation level setting described above.

Figure 4:
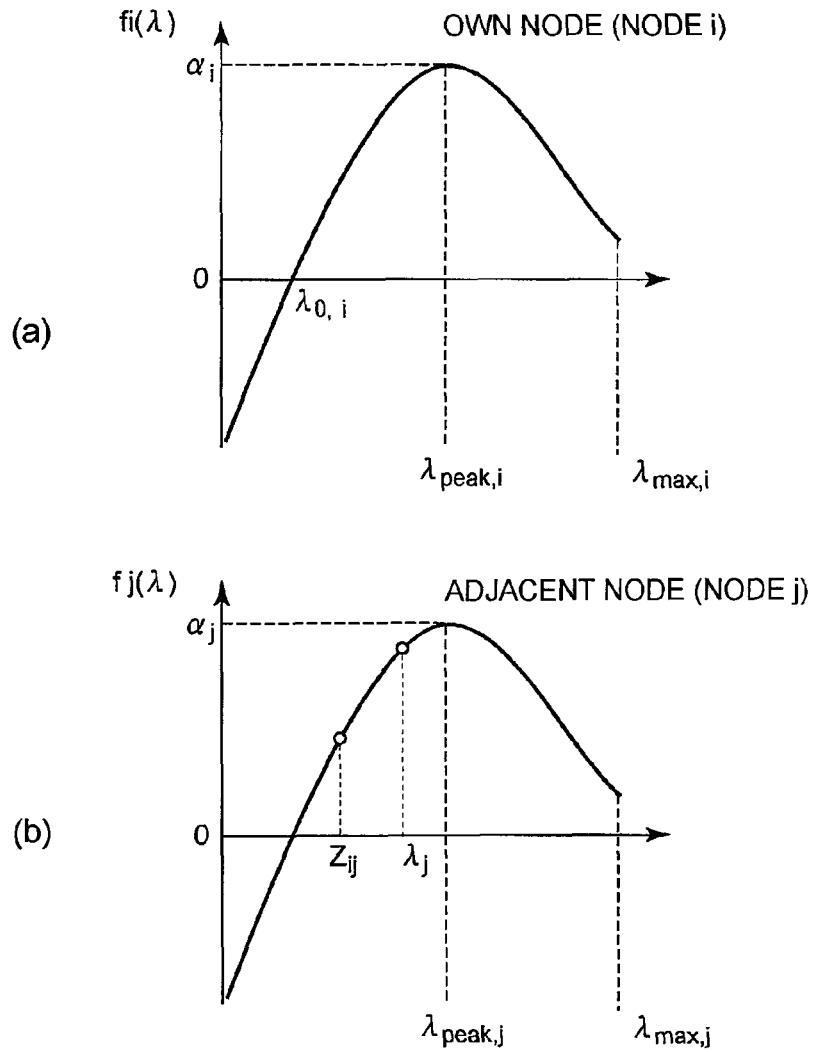
FIG. 4 includes (a) and (b) which are schematic diagrams of relations between indices used in the embodiment mode and the evaluation functions.

An index is defined first between an evaluation function of its own node (function block) and an evaluation function of a node adjacent to the own node. FIG. 4 are explanatory diagrams illustrating an example of the relation. In the drawing, the efficiency or profit (axis of ordinate: $f_{i(\lambda)}$) takes a negative value when the load (operation level) is 0, which means that cost is incurred by allowing a node to be active. In the case where the axis of ordinate represents profit, for example, a power house that is running (active) when there is no demand and there are accordingly no fees to collect from customers reduces the profit by an amount corresponding to the cost of running (activating) the power house. A negative value in the graph of FIG. 4 indicates such state. Though a detailed description is given later in the embodiments, in the optimization of data center response or similar cases, the axis of ordinate represents an amount related to response and the evaluation function takes a positive value even at a point where the load is 0. While the evaluation function takes a positive value in some cases and a negative value in other cases when the load is 0, preparing for the case where the evaluation function takes a negative value means that the case where the evaluation function has a positive value can be solved as a part thereof. The case where the evaluation function takes a negative value when the load is 0 is therefore described here.

A zero crossing point of a node i (own node) is given as $\lambda_{0,j}$, a point in an evaluation function of an adjacent node j that has the same gradient as the zero crossing point of the node i is given as $Z_{i,j}$, and the current load of the adjacent node j is given as $\lambda_j$. Then $Z_{i,j}$ is expressed by the following Expression 6.

$$\left(\frac{\partial f_j}{\partial \lambda}\right)_{\lambda = Zij} = \left(\frac{\partial f_j}{\partial \lambda}\right)_{\lambda = \lambda_{0,i}} \quad (6)$$

From the above relation, the following index (Expression 7) is found and defined.

$$S_i = \sum_{j \neq i} (\lambda j - z_{ij}) - \lambda_{0,i} \quad (7)$$

This index indicates how much heavier the current load (sum) of the adjacent node is than at the zero crossing point of the own node. A condition for activating the node i, namely, own node, which is shut down at the moment is whether the situation causes the own node to bear load equal to or heavier than at the zero crossing point when the own node is activated.

In this way, the profit of the overall system is prevented from dropping down to a minus figure, and activating the node i does not cause the system to be disadvantage.

An index $S_i$ is an indicator developed from a relation between the node i and its adjacent node at the node i. In other words, the index $S_i$ of each function block turns a relation between the function block and another function block related thereto into an indicator.

The first term on the right side of Expression 7 indicates how much heavier load the adjacent node is bearing than $Z_{i,j}$, which is equivalent to the differential value of the evaluation function at the zero crossing point of the node i. From a value obtained by the first term on the right side, the value of the zero crossing point $\lambda_{0,j}$ of the node i which is expressed by the second term on the right side is subtracted, to thereby calculate worth to the overall system. In other words, the index $S_i$ is designed so that whether or not there is load equal to or heavier than at the zero crossing point of the own node around the own node can be determined by whether the calculated value is a positive value or a negative value.

In the case where $S_i$ is larger than 0, load born by one of related adjacent nodes is shared by the node i when the node i is activated, and the load that the node i bears (worth (profit) provided to the system) is equal to or heavier than at the zero crossing point.

In the case where $S_i$ is smaller than 0, on the other hand, load that the node i newly shares with the adjacent node has a value equal to or less than at the zero crossing point, and activating the node i turns worth/profit provided to the system into a minus figure.

The index $S_i$ visualizes the characteristics described above, and whether to activate or shut down the node i is understood by seeing whether $S_i$ has a positive value or a negative value. $S_i$ having a negative value indicates that the load of the node i at that point is in an area where the evaluation function takes a negative value, and it can be interpreted that an active node is shut down at the time when the evaluation function becomes 0 or less.

To paraphrase these, a node is activated when it is determined that activating the node provides greater worth to the system than at present (does not burden the system), by using a relation between the value of the evaluation function of a related function block that is equivalent or related to the gradient of the evaluation function of the node in question at the zero crossing point and a value provided by the related function block at that point in determining whether to activate the node through a comparison between worth that can be provided by adding the node to the system at present and worth that is a burden put on the system by activating the node in question.

When shutting down an active node, the following are taken into consideration in addition to the control described above, with regard to activation/shutdown in the case where nodes have the same performance.

In the case where running nodes cost, allowing only one of the nodes to be in an active state while shutting down the rest is often advisable. In the case of nodes that have the same performance, however, which node is to be shut down cannot be determined through the above control alone. The following algorithm is therefore introduced to the control described above.

"A node is shut down when the evaluation function value is equal to or less than 0 and is the smallest among adjacent nodes.

The value comparison is made between active nodes.

The node is shut down even when a plurality of nodes have the minimum value."

This way, in the case where load is extremely light and the network is a fully connected network, only one node ultimately remains despite all nodes having the same performance. Although there is a chance that a few segments remain even with this algorithm in the case of a sparsely connected network, such cases can be dealt with by performing the algorithm after searching for practically adjacent nodes via a load balancer, or by other methods.

As described above, the "unit commitment problem" can be solved in real time unitarily with output control by executing the monitoring of the index of Expression 7 and activation/shutdown determination based on the shutdown algorithm while controlling output via Expression 5. This is revolutionary compared to existing methods which solve the "unit commitment problem" by scheduling in advance, because this is capable of quickly dealing with an unexpected external disturbance or a change in demand-supply in real time.

In addition, this system basically operates independently in an autonomous decentralized manner. Therefore, when a failure occurs in some part of the system, other components autonomously perform recovery to compensate for the loss of signals from a failed component. The system can also shift toward a proper operation gradually and autonomously after a sudden addition or removal of a component. In other words, the system is very robust with respect to an external disturbance, and has a scalability that gives freedom in adding/removing components.

A system based on the existing technologies is helpless to a failure or needs to prepare various error sequences. There is also no guarantee that the stability of the overall system is maintained after an unplanned addition or removal of a component (resource), and programs and processing need to be reviewed each time. The system here is capable of solving all these problems through autonomous decentralized adaptive control.

The description of demand-supply balancing given above mentions that demand-supply balancing is often a restraint condition that demands fulfillment of the total amount of mission or task required of the overall system. However, there could be other cases and, in those cases, control is exerted by transforming the term of demand-supply balancing described above so that a restraint condition thereof is fulfilled.

In the case of an electric power system or the like where an unbalancing of the demand-supply balance can be detected from fluctuations in alternating current frequency, demand-supply balancing, too, can be executed in a completely autonomous decentralized manner. In other words, nodes that can obtain information about demand-supply balancing from themselves constitute a true autonomous decentralized system which does not need overall information.

Figure 5:
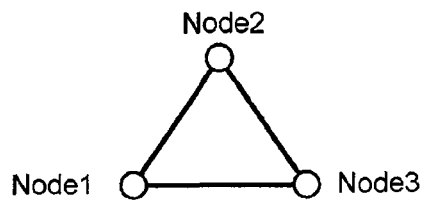
FIG. 5 is a schematic diagram of a network structure used in verification of the embodiment mode.

A detailed control operation of this embodiment mode is described below. For simplification, the description here uses a network state having a triangular structure in which three nodes are connected to one another. This network structure is illustrated in FIG. 5.

Figure 6:
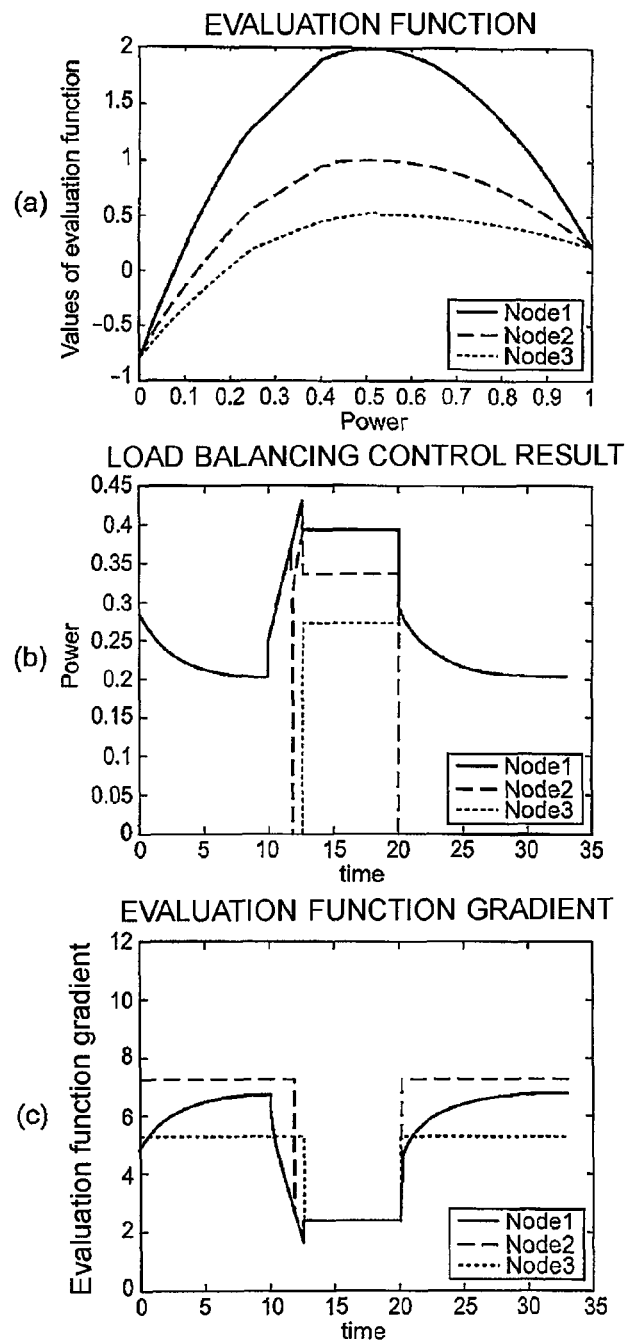
FIG. 6 includes (a), (b), and (c) which are explanatory diagrams illustrating an example of an operation result of the embodiment mode.

First, different evaluation functions are set to the three nodes as illustrated in FIG. 6(a). Thereafter, the activation/shutdown and load sharing of the three nodes are executed through the control described above, while changing the overall demand for electric power to 0.2 from a time 0 to a time 10, 1.0 from the time 10 to a time 20, and back to 0.2 past the time 20. The result of the control is illustrated in FIG. 6(b). As can be seen in FIG. 6(b), only a node 1 which has the highest profit efficiency is activated and in operation when the overall demand is 0.2. When the overall demand increases to 1.0, a node 2 and a node 3 are activated in the order of performance, and load sharing is set. When the overall demand is back to 0.2, the nodes 2 and 3 are shut down to return to the state where only the node 1 is active. Evaluation function gradients of the respective nodes in this case are illustrated in FIG. 6(c).

This control is designed so that an optimum solution to the unit commitment problem is obtained mathematically. The system can thus adapt to an external disturbance (a sudden change in demand) while solving the unit commitment problem in real time (dynamically), which is a very significant achievement.

Figure 7:
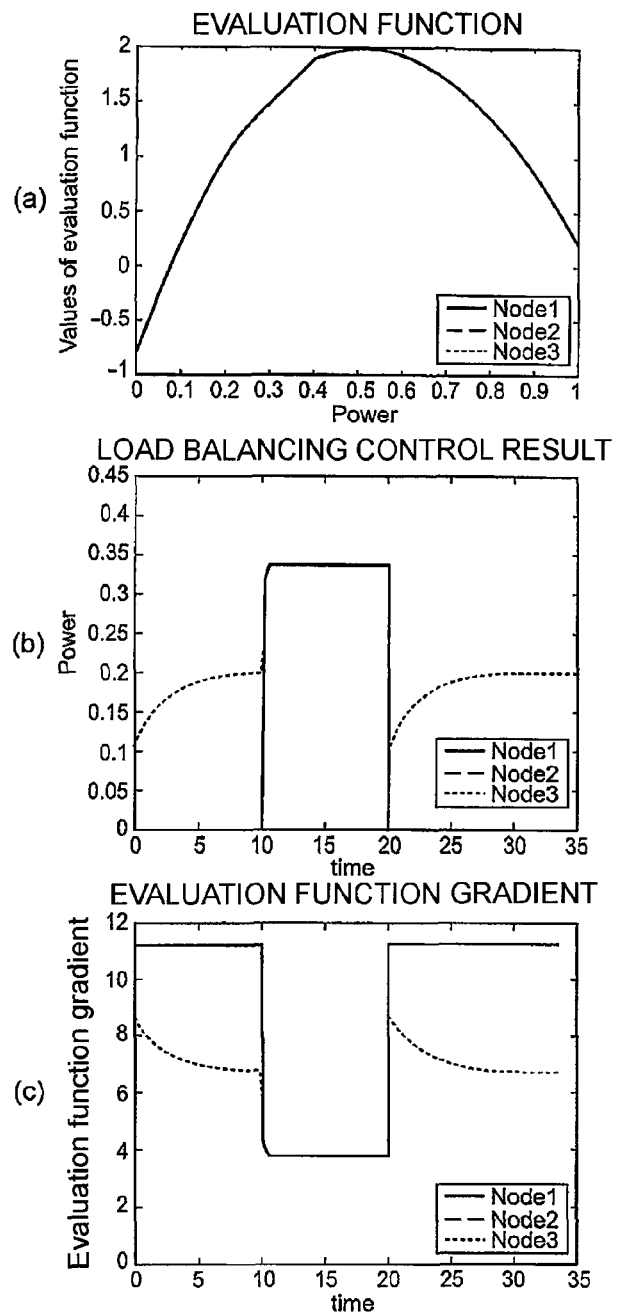
FIG. 7 includes (a), (b), and (c) which are explanatory diagrams illustrating another example of the operation result of the embodiment mode.

An example of the case where the three nodes have the same performance is illustrated in FIGS. 7(a), 7(b), and 7(c). Evaluation function graphs of the nodes which have the same performance all overlap one another. In this case, too, the overall demand has been changed to 0.2 from the time 0 to the time 10, 1.0 from the time 10 to the time 20, and back to 0.2 past the time 20. Because all nodes have the same performance, only the node 3 is active when the overall demand is 0.2, and the three nodes equally share load when the overall demand is 1.0.

This control is thus effective for optimization also when activating a node costs and nodes have the same performance.

Next, the embodiments are described in detail with reference to the drawings.

First Embodiment

This invention has been carried out with respect to the "unit commitment problem" of the power generators illustrated in FIG. 1. An operation level $\lambda_i$ (i represents a function block number) of a power generator in this case corresponds to a generated power that is allocated to the power generator. Evaluation functions as those illustrated in FIGS. 4(a) and 4(b) are set to the respective power generators. Performance is not uniform among the generators, and the peak value ($\alpha$) and the limit power value ($\lambda$max) vary from one generator to another. The axis of ordinate represents an economical profit from power generation as simplified worth to be provided to the system. Accordingly, when the evaluation function of a power generator has a positive value, power generation by the power generator profits the owner of the power generator, and incurs loss when the evaluation function has a negative value. It is desired on the whole for the electric power system to control individual power generators to the demand so that profit is maximized. The evaluation function value is a negative value when load is 0, where activating a power generator costs. The set evaluation functions are quadratic functions which are convex functions. It is a known fact that a profit function of a power generator can be approximated by a quadratic function.

The evaluation functions described above have been used in an experiment for controlling the power generators of FIG. 1. Each power generator has the control system illustrated in FIG. 2. Each generator executes activation/shutdown control while checking an evaluation function that is set to itself and the situation (evaluation functions) of other generators that are connected to itself.

As mentioned above, activation/shutdown control can be divided into determining whether to activate/shut down a component (resource) and determining load arrangement among components that are determined as ones to be activated. The original activation/shutdown control of this invention is to execute the two in real time, but this invention may also be applied so that activation/shutdown determination alone, or load arrangement determination alone, is executed. In this activation/shutdown control, the original control in which the two are executed unitarily in real time has been performed.

Whether overall demand is being fulfilled can be known locally in power generator control. Knowing locally means that a power generator can know from information that the power generator obtains from its surroundings, without obtaining overall system information. The alternating current frequency is known to decrease uniformly throughout the system when the supply of electric power is short and, conversely, to increase when electric power is supplied in excess. By using this principle, whether the generated power is excessive or short with respect to the overall demand can be determined locally without knowing the generated power of all generators.

In short, the first term on the right side of Expression 5 can be calculated locally. In addition, the second term on the right side of Expression 5 is locally obtained information to begin with. The power generators can consequently accomplish control of Expression 5 with local information alone. Accordingly, there is no need for a centralizing device that monitors the generated power of all generators in order to know information about overall demand. However, in the case where the component (resource) network has a star shape or other similar cases, the component at the center of the star may manage the overall demand.

Connecting all power generators to one another is also not necessary because, in an interconnected network, local information, too, eventually circulates throughout the system.

Coefficients K1 and K2 for determining load balancing of the evaluation functions and others have been set suitably. The profit is not uniform among the power generators, and a peak $\alpha_i$ is set higher for a power generator that has a higher profit.

Figure 8:
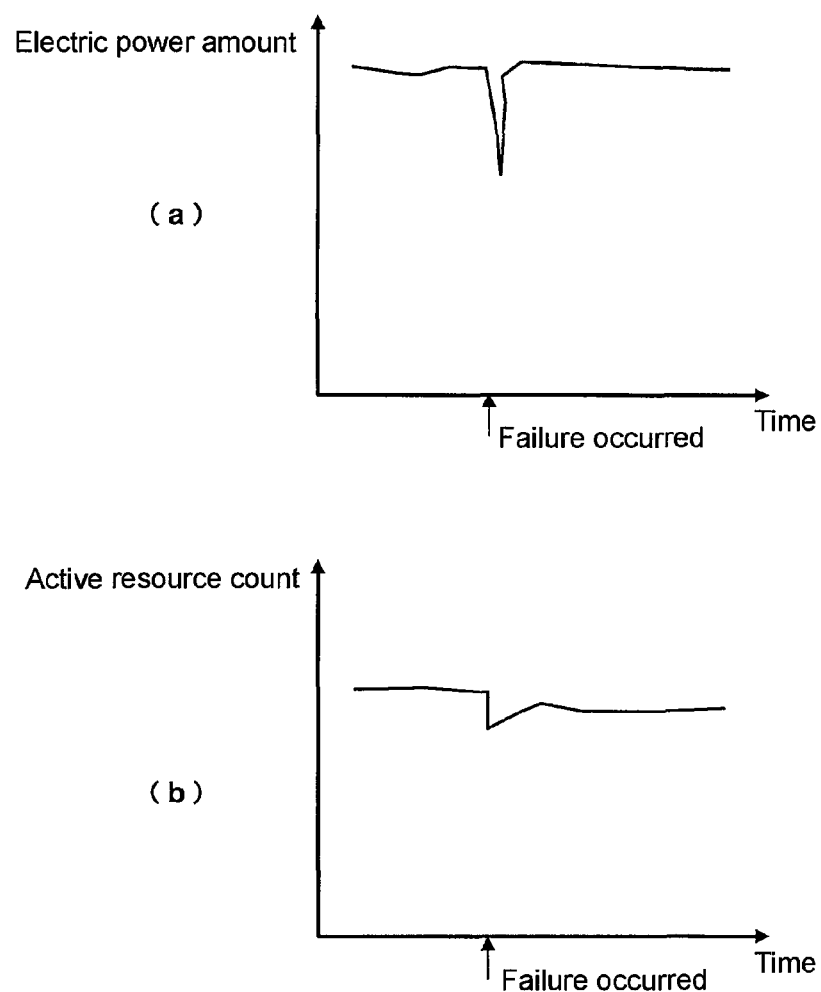
FIG. 8 includes (a) and (b) which are explanatory diagrams illustrating an experiment result in a first embodiment of this invention.

FIGS. 8(a) and 8(b) show a first experiment result. The axis of abscissa represents time in each graph, and the axis of ordinate represents the overall power amount of the system in FIG. 8(a) and the count of active power generators in FIG. 8(b). When the system is operating to meet a certain power demand, ten percent of generators are artificially stopped (points indicated by arrows in the drawings) by citing a failure as the reason. The graphs show that the power supply ability drops temporarily but recovers autonomously. Because the system has heterogeneous power generators whose abilities are not uniform, the count of power generators that are in use after autonomous recovery differs from before the power generators are stopped artificially. This is the very indication that the unit commitment problem has been solved autonomously. The effectiveness of this invention with regard to robustness against failure has thus been confirmed.

Figure 9:
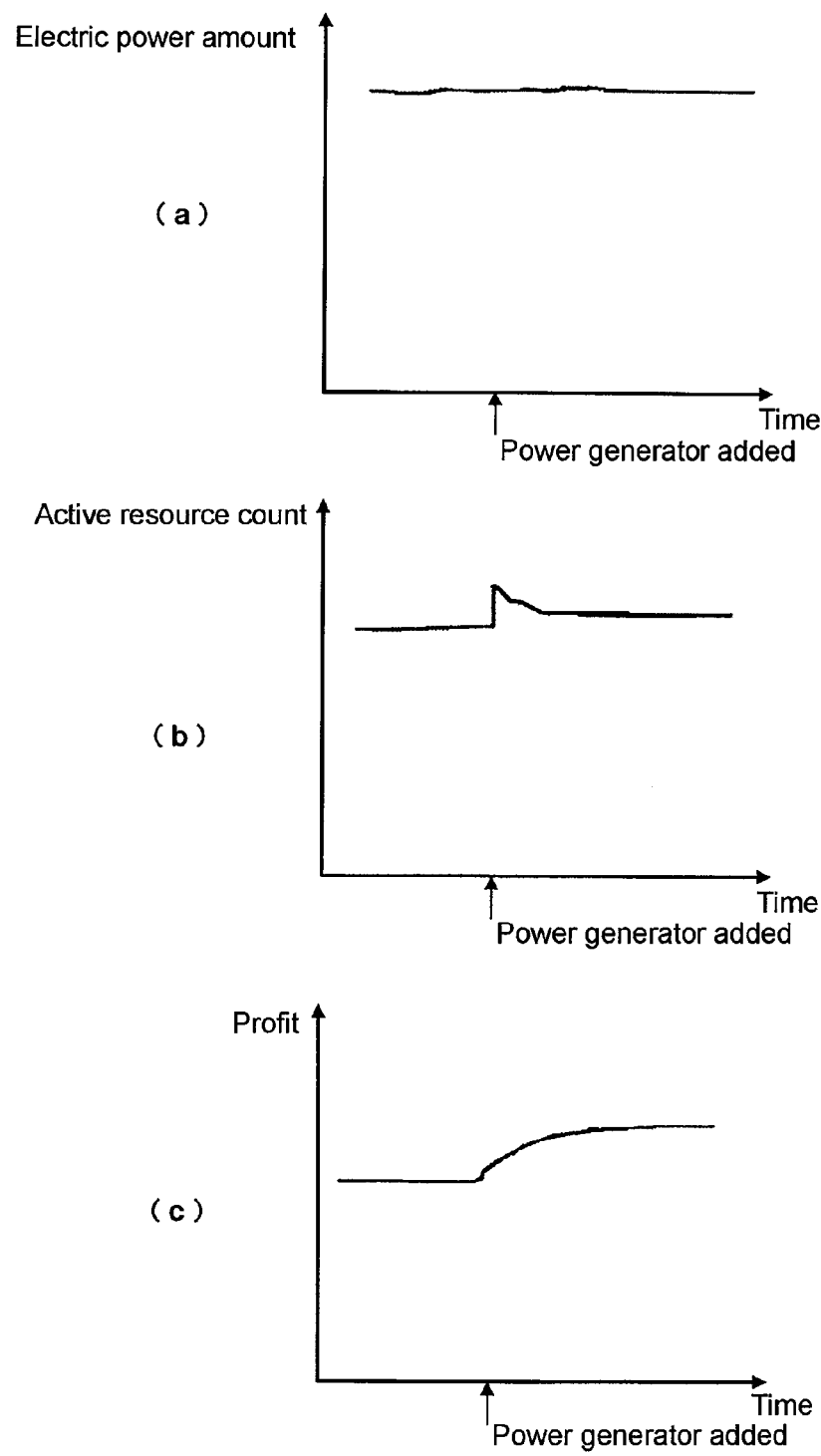
FIG. 9 includes (a), (b), and (c) which are explanatory diagrams illustrating another experiment result in the first embodiment.

FIGS. 9(a), 9(b), and 9(c) show a second experiment result. The axis of abscissa represents time in each graph, and the axis of ordinate represents the overall power amount of the system in FIG. 9(a), the count of active power generators in FIG. 9(b), and the profit in FIG. 9(c). When the system is operating to meet a certain power demand, 100 generators are artificially added (points indicated by arrows in the drawings). Then the system autonomously determines whether to activate/shut down for each power generator including the added power generators, without changing its power generation ability, and settles into a stable state. The graph shows that the overall profit of the system has increased at that point. This means that power generators high in profit efficiency are picked out of the added power generators and activated whereas power generators that have been in use and low in profit efficiency are shut down, and proves that the unit commitment problem has been solved autonomously to maximize profit. This also indicates that the system is scalable, which means that there is no need to change programs or processing in response to the addition or removal of a resource. This is a very useful characteristic and the effectiveness of this invention has been confirmed.

Second Embodiment

Control for the unit commitment problem of power generators has been described in the first embodiment. The second and subsequent embodiments discuss embodiments in other fields in order to show the wide range of application of this invention.

Figure 10:
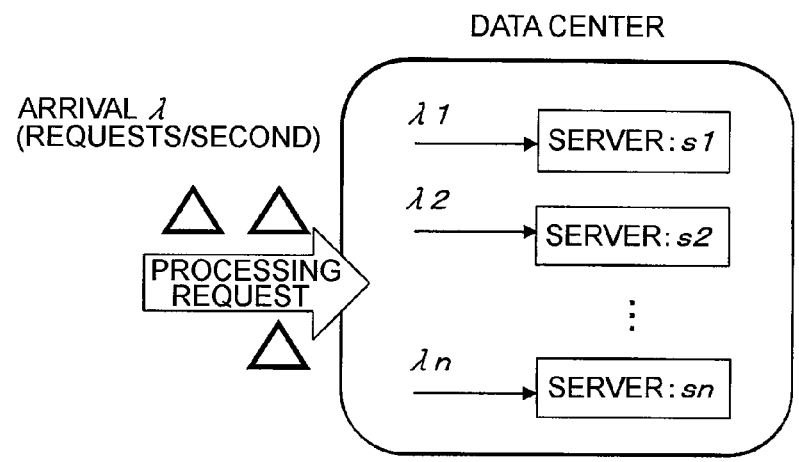
FIG. 10 is a schematic diagram of a system studied in a second embodiment of this invention.

This invention has been carried out for load balancing among resources of a data center which is illustrated in FIG. 10. The operation level $\lambda_i$ (i represents a function block number) of a resource in this case corresponds to a task amount (workload) that is allocated to the resource.

When load balancing among resources of a data center is considered, restraint conditions that matter to an administrator are response, throughput, consumed energy, and the like. An embodiment of this invention in which response and throughput are restraint conditions is described first.

Response and throughput are closely related amounts and, in addition, have a trade-off relation. To give a brief description, throughput rises and response drops as a server approaches its processing limit. Response also has a characteristic in that the drop that occurs when the server approaches the processing limit is sharp, which is explained by the queueing theory. The administrator of servers needs to balance load on the servers so that response requests and throughput requests of a system that the administrator manages are balanced as much as possible.

Settings set by an administrator in order to balance load in a data center are described. Because response and throughput are in a trade-off relation as described above, a rather light workload $\lambda_i$ is to be distributed among components (resources) when response is valued more, and a heavy workload $\lambda_i$ is to be distributed when throughput is valued more. Accordingly, functions set to the respective components are set by, for example, the following method.

Figure 11:
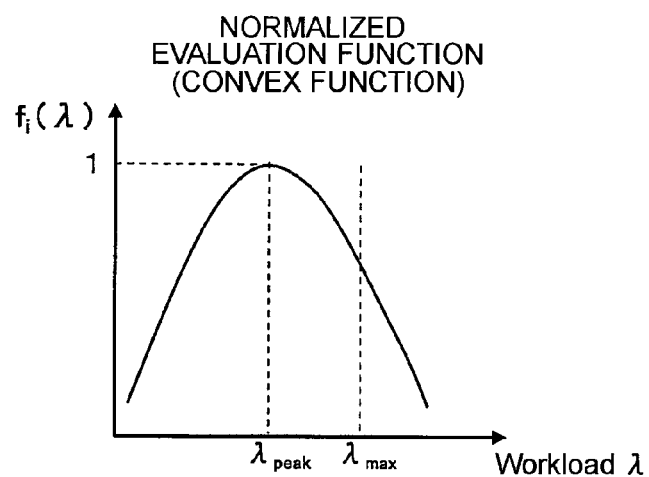
FIG. 11 is an explanatory diagram illustrating an example of an evaluation function that is used in the second embodiment.

FIG. 11 is a schematic diagram of an evaluation function set to each server. The axis of abscissa represents the workload $\lambda_i$ because the subject studied in this embodiment is load balancing. As described above, convex functions are preferred as evaluation functions, and a quadratic function that is convexed upward is used here. The symbol $\lambda_{max}$ represents a limit of a server resource that corresponds to a function block in question, and the symbol $\lambda_{peak}$ represents a peak point of the evaluation function. By normalization in which the peak of the evaluation function is set as 1, the normalized evaluation function is determined as a quadratic function that passes through (0, 0) and ($\lambda_{peak}$, 1). What should be noted here is that, unlike the first embodiment, the evaluation function does not have a negative value around the origin, which means that activating a server does not cost. This is an appropriate way when activation/shutdown does not deteriorate response and throughput much.

An evaluation function is set to each function block by multiplying the normalized evaluation function by a coefficient $\alpha_i$, which is in proportion to a difference in performance between components (resources) corresponding to function blocks. As described above, a rather light workload $\lambda_i$ is distributed among the components (resources) when response is valued more, and a rather heavy workload $\lambda_i$ is distributed when throughput is valued more. Accordingly, in the case where the system is to process work by putting importance to response, the point $\lambda_{peak}$ is set rather small whereas the point $\lambda_{peak}$ is set rather large when the system is to process work by putting importance to throughput.

The data center system uses the described method of this invention to operate while solving the unit commitment problem. As a result, load balancing that allocates, to each component, a workload as close to the point $\lambda_{peak}$ of the component as possible is accomplished. Therefore, with the point $\lambda_{peak}$ set rather small, work is distributed among components bearing relatively light loads, and the overall system operates in a manner that values response more. With the point $\lambda_{peak}$ set rather large, work is distributed among components bearing relatively heavy loads, and the overall system operates in a manner that values throughput more. The data center system consequently shuts down resources that are being wasted as seen fit, thereby accomplishing control free from a waste of energy as well.

The axis of ordinate of the evaluation function in this case does not really represent some form of efficiency. The axis of ordinate rather indicates a point where the administrator wishes for the system to operate, and setting the evaluation function is not ruled by any physical quantity or principle. A person who wishes to run the system can set the axis of ordinate and the axis of abscissa at his/her own discretion. In a sense, once the system is given an instruction from a person in the form of an evaluation function, the system operates autonomously in a concerted manner from then on.

While the evaluation function here is obtained by multiplying a quadratic function that passes through (0, 0) and ($\lambda_{peak}$, 1) by the coefficient $\alpha_i$, various other evaluation functions can be set as long as the evaluation functions are convex functions. In an extreme case, a hand-drawn evaluation function may be set to each component.

An experiment of the load balancing in a data center which is illustrated in FIG. 10 has been conducted with the use of the evaluation function described above. Each server has the control system of this invention which is illustrated in FIG. 2 as a built-in component, and exerts activation/shutdown control while checking an evaluation function set to itself and the situation of another server connected to itself. Every server in this experiment is connected so that a difference between overall requests (demand) and the overall workload of the system at present which is necessary for demand-supply balancing can be monitored. In the case where connecting every server is a trouble, a part capable of monitoring a difference between demand and supply and informing each server of the difference may be set at the input. Another possible course of action is to give the network structure a star shape.

Coefficients K1 and K2 for determining load balancing of evaluation functions and others have been set suitably. The total count of servers is 1,000. Performance is not uniform among the servers, and a larger $\alpha_i$ has been set to a server having higher performance.

Figure 12:
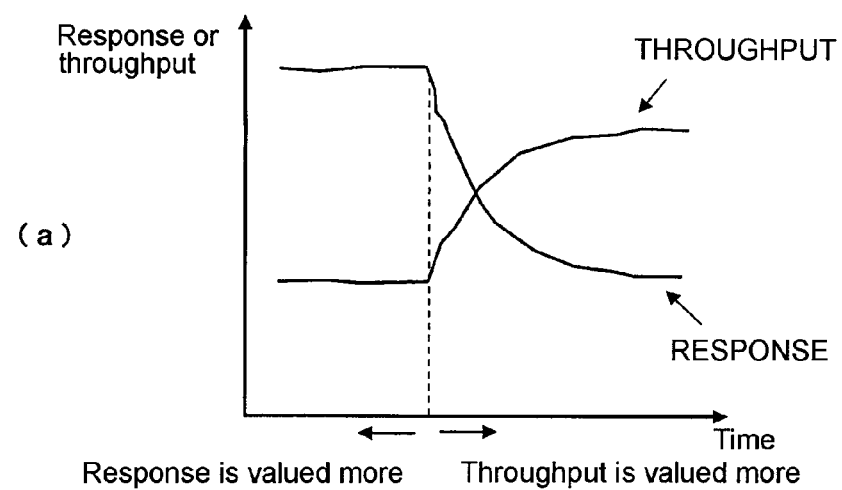
FIG. 12 includes (a) and (b) which are explanatory diagrams illustrating an experiment result in the second embodiment.
Figure 12:
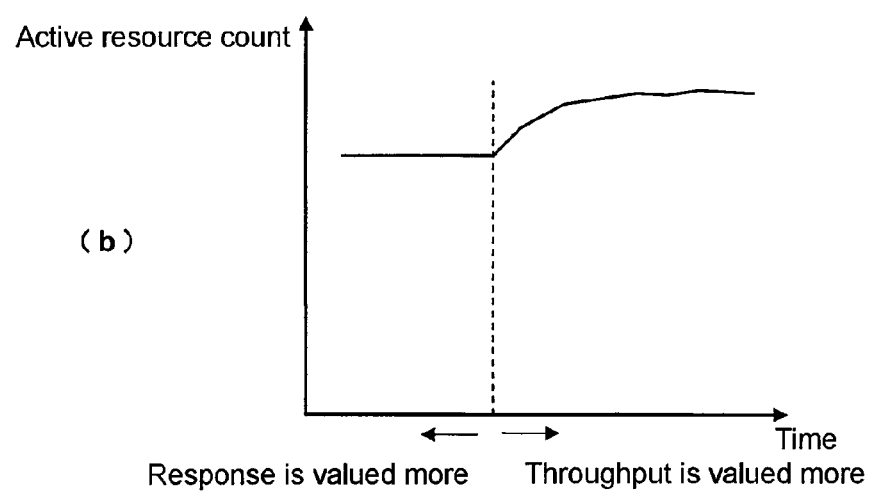

FIGS. 12(a) and 12(b) show a first experiment result. The axis of abscissa represents time in each of the graphs. The axis of ordinate represents the overall effective response/throughput of the system in FIG. 12(a), and the count of servers that are active in FIG. 12(b). The system is at first run in a manner that puts importance to response by setting $\lambda_{peak}$ rather small. Thereafter, $\lambda_{peak}$ is reset so as to have a rather large value at a given time (a time indicated by a dotted line in each graph). As a result, the system autonomously shifts its operation toward a direction where throughput is valued more. The count of active servers is also adjusted appropriately, and the effectiveness of this invention has been confirmed.

Figure 13:
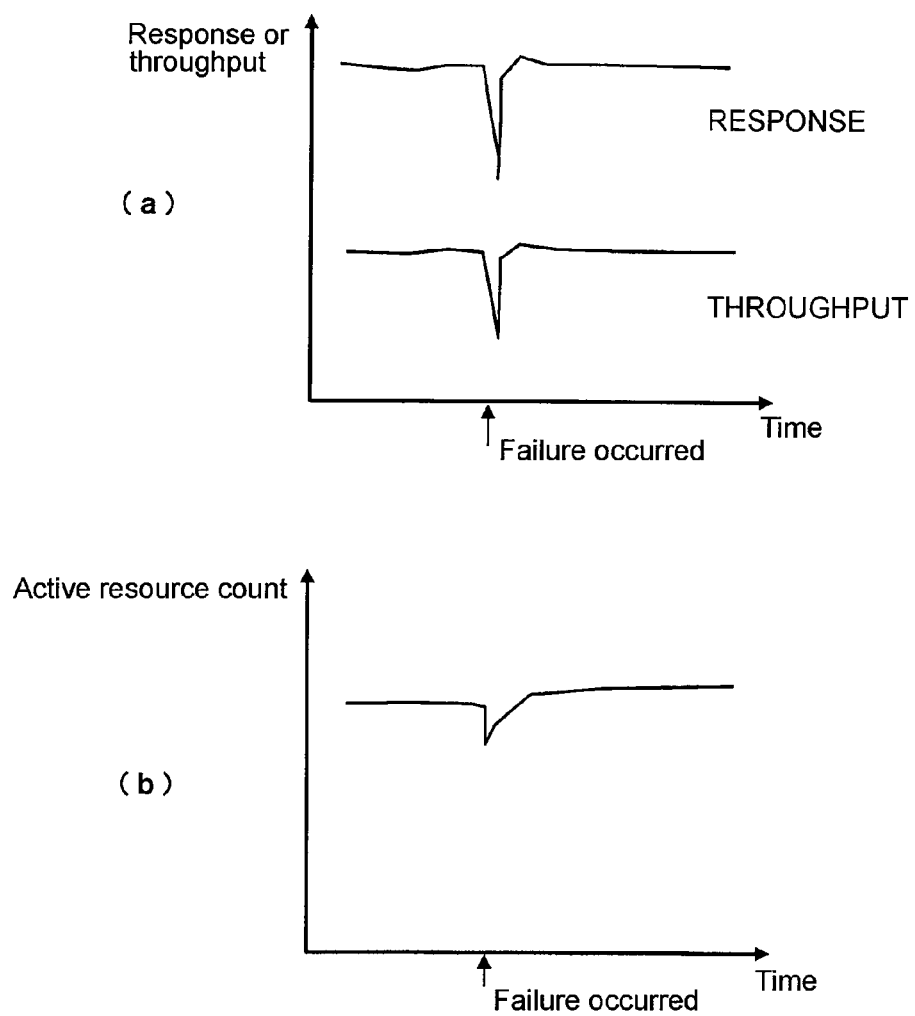
FIG. 13 includes (a) and (b) which are explanatory diagrams illustrating another experiment result in the second embodiment.

FIGS. 13(a) and 13(b) show a second experiment result. The axis of abscissa represents time in each of the graphs. The axis of ordinate represents the overall effective response/throughput of the system in FIG. 13(a), and the count of servers that are active in FIG. 13(b). When the system is operating at certain $\lambda_{peak}$ settings, ten percent of specific servers are artificially stopped (a point indicated by an arrow in each graph). As a result, the throughput and response performance of the system drop temporarily but recover autonomously with time. Because the system has heterogeneous servers whose abilities are not uniform, the count of servers that are in use after autonomous recovery differs from before the servers are stopped artificially. This is the very indication that the unit commitment problem has been solved autonomously. The effectiveness of this invention with regard to robustness against failure has thus been confirmed.

Figure 14:
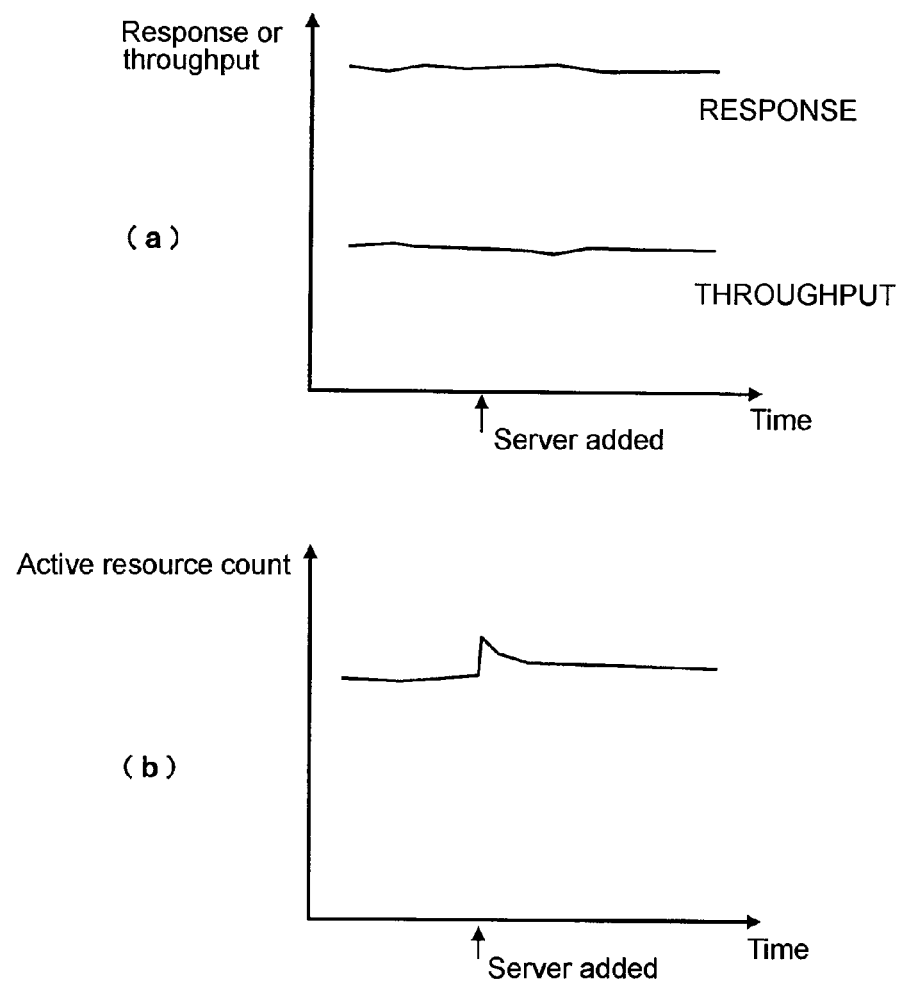
FIG. 14 includes (a) and (b) which are explanatory diagrams illustrating still another experiment result in the second embodiment.

FIGS. 14(a) and 14(b) show a third experiment result. The axis of abscissa represents time in each of the graphs. The axis of ordinate represents the overall effective response/throughput of the system in FIG. 14(a), and the count of servers that are active in FIG. 14(b). When the system is operating at certain $\lambda_{peak}$ settings, 100 new servers are artificially added (a point indicated by an arrow in each graph). Then the system operates so as to settle into a stable state by autonomously determining whether to activate/shut down for each of the servers including the added servers, without changing its throughput and response performance. This indicates that the system is scalable, which means that there is no need to change programs or processing in response to the addition or removal of a resource. This is a very useful characteristic and the effectiveness of this invention has been confirmed.

The above shows that this invention is similarly effective for load balancing and activation control also when an activation cost (deterioration caused by activation) is not set in evaluation functions. In addition, the above shows that this invention is applicable not only to the activation/shutdown of power generators but also to server load balancing, which is classified into the IT field. In cases where the activation/shutdown of servers changes response or throughput greatly, evaluation functions are set so as to take a negative value in the vicinity of the origin as in the first embodiment.

Third Embodiment

Another experiment has been conducted with regard to the load balancing among resources of a data center which is illustrated in FIG. 10 as in the second embodiment. While the second embodiment is an embodiment of this invention where response and throughput constitute restraint conditions, this embodiment discusses a case where energy constitutes a restraint condition. Energy constituting a restraint condition can be paraphrased as running a system while saving power as much as possible.

This issue, too, can basically be solved by how an evaluation function is set.

Drawing on an efficiency expression "effective power/total power consumption", an energy efficiency $f_i(\lambda)$ of what is run is expressed with the use of idling power consumption $H_{def}$, work-hour power consumption $f_i(\lambda)$, and work-hour additional power consumption (of an air cooling fan or the like) H by the following Expression 8.

$$f_i(\lambda) = \frac{W(\lambda)}{H_{def} + W(\lambda) + H} \qquad (8)$$

Figure 15:
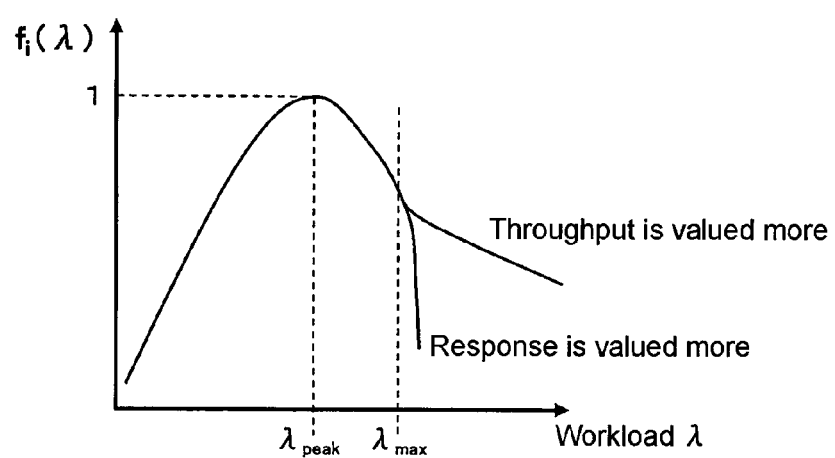
FIG. 15 is an explanatory diagram illustrating an example of an evaluation function that is used in a third embodiment of this invention.

The efficiency $f_i(\lambda)$ is in general a convex function that peaks at some point that is equal to or less than $\lambda_{max}$, and Expression 8 is used as an evaluation function when the workload is equal to or less than $\lambda_{max}$. A workload equal to or more than $\lambda_{max}$ cannot be defined with this energy efficiency expression, and an artificially drawn evaluation function is therefore used here. In this case, $\lambda_{max}$ is not the true limit of the device but an upper limit value that is obtained by allowing some margin to the limit (a safe area). Given here is an example of how to react to an output equal to or more than the safe area, which is a recommended area. An image of the evaluation function used here is illustrated in FIG. 15. The evaluation function for a workload that exceeds $\lambda_{max}$ may be set by a person running the system at his/her discretion. For instance, in the case where importance is put to response, the evaluation function is given a steep gradient in order to reduce workload quickly, whereas the evaluation function is drawn as a curve with a gentle gradient in the case where importance is put to throughput and workload does not need to be reduced at once. The evaluation function can thus be designed freely by the person running the system. However, one should be aware of the possibility that taking the freedom too far might make it impossible to tell whether a value to be modified into a proper value by the evaluation function is being modified in objective quantitative properties. For instance, the evaluation function here which is a quantitative energy efficiency function at $\lambda_{max}$ or less is a qualitative function, such as the comfort level of the person running the system, at a workload that is equal to or more than $\lambda_{max}$. When objective quantitative properties are absolutely necessary, using an objective index or thinking of a value that can be converted into an objective index is needed. Then again, considering that existing systems are often run based on experiences of their administrators or at the discretion of the administrators, being able to run a system with a qualitative evaluation function allows an administrator to run a system at his/her discretion and is rather a beneficial characteristic. Unlike the first embodiment, the discussed case in which energy is what is to be modified into a proper value does not use an evaluation function that has a negative area around the origin due to an activation cost. Whether to set an activation cost, too, can be determined at the administrator's discretion.

Figure 16:
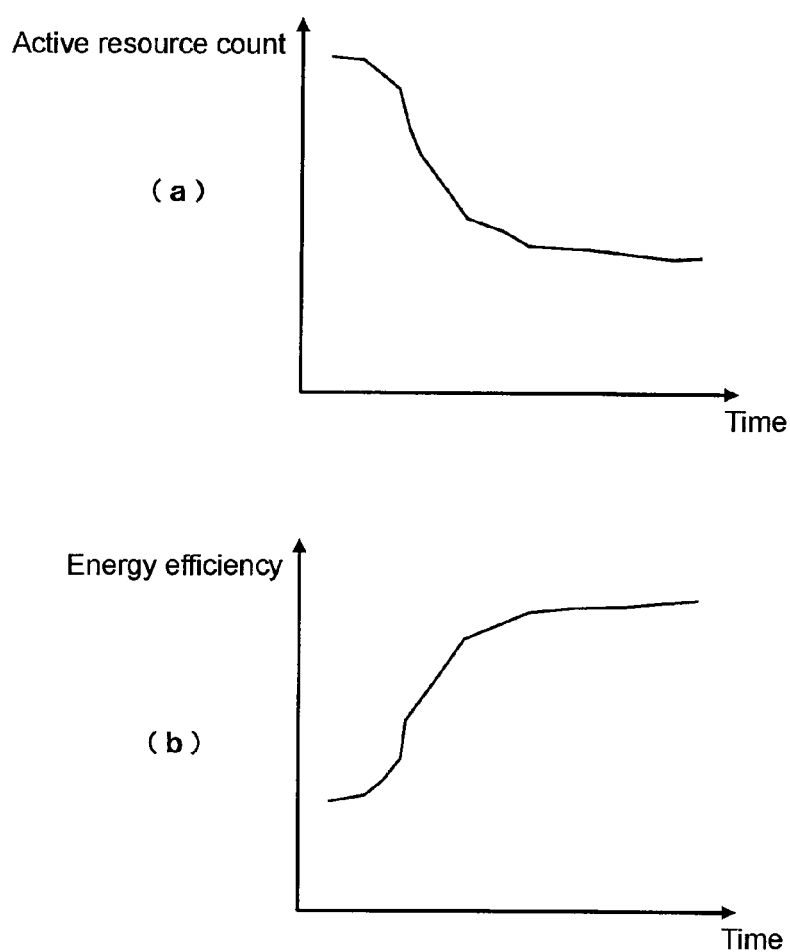
FIG. 16 includes (a) and (b) which are explanatory diagrams illustrating an experiment result in the third embodiment.

An experiment of load balancing in a data center has been conducted with the use of the evaluation function described above and the same configuration as the one in the first embodiment. The result is shown in FIGS. 16(*a*) and 16(*b*). In this example, all servers (1,000 servers) are in operation at first, and then measured for changes with time in terms of active resource count (the count of active servers) (FIG. 16(*a*)) and energy efficiency (FIG. 16(*b*)). It can be seen in the graphs that, while there is a waste of energy in the beginning where all servers are put into operation, energy consumption is then reduced by autonomously selecting servers to be activated and balancing load. In short, the effectiveness of this invention has been confirmed.

Fourth Embodiment

Figure 17:
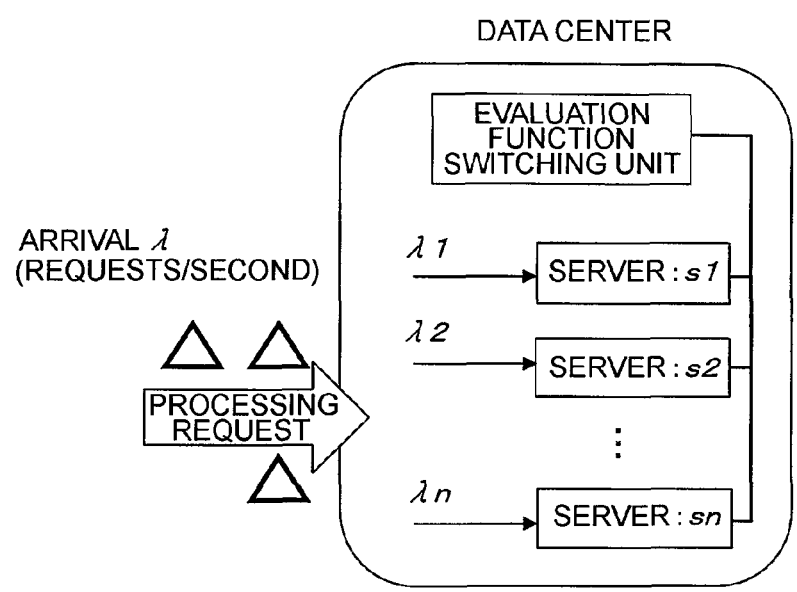
FIG. 17 is a schematic diagram of a system studied in a fourth embodiment of this invention.

This embodiment discusses a method of switching, depending on the situation, between the control described in the second embodiment which puts importance to response or throughput and the control described in the third embodiment which puts importance to energy efficiency. An experiment has been conducted which uses basically the same data center configuration as the one in the second embodiment, but differs in that the system includes an evaluation function switching unit which issues a command to switch evaluation functions depending on the situation. A schematic diagram of the system is illustrated in FIG. 17. The evaluation function switching unit transmits to each resource a command to switch the evaluation function used by the resource to one of the evaluation function that is used in the second embodiment and the evaluation function that is used in the third embodiment. Receiving the command, the resource sets the evaluation function specified in the command and executes control for solving the unit commitment problem and the optimization issue. The evaluation function switching unit may transmit a command to each resource by receiving a wish of the administrator and selecting an evaluation function suitable for the wish. Alternatively, a classifier for determining the situation from some external input may be provided in order to automatically select an evaluation function with the use of the classifier.

While the switching here is between two types, i.e., the evaluation function used in the second embodiment and the evaluation function used in the third embodiment, the count of evaluation function types between which a switch is made does not need to be limited to two, and a switch can be made between as many evaluation functions as desired by setting necessary evaluation functions. In short, the evaluation function switching unit may switch from one out of two or more evaluation functions to another. The evaluation function switching unit may also be designed so that only evaluation functions of specific resources are switched. The evaluation function switching unit does not need to switch evaluation functions for two or more resources concurrently, and the manner in which a switching operation is performed can be set as seen fit. A single evaluation function switching unit is provided to control all resources here. Instead, distributed arrangement may be employed by, for example, providing one evaluation function switching unit in each component (resource).

Figure 18:
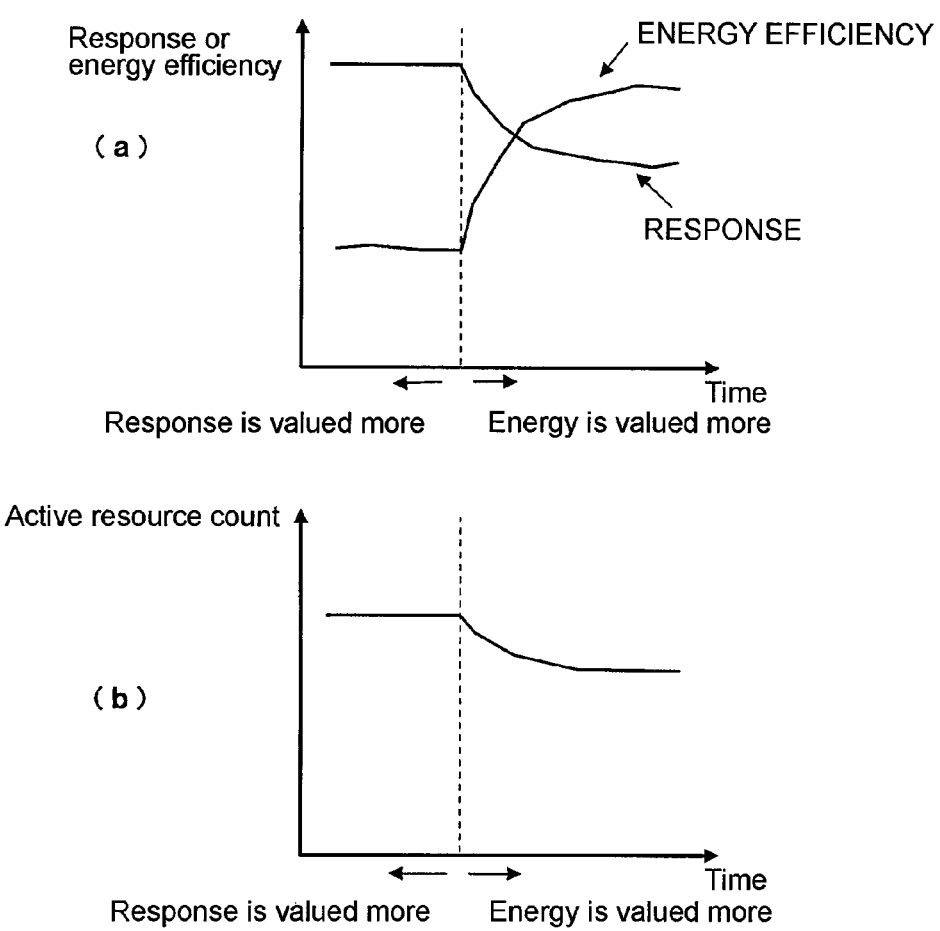
FIG. 18 includes (a) and (b) which are explanatory diagrams illustrating an experiment result in the fourth embodiment.

Results of the experiment that uses the system described above are shown in FIGS. 18(*a*) and 18(*b*). Conditions here are the same as those in the second and third embodiments, except that the evaluation function switching unit is provided. The axis of abscissa represents time in each of the graphs. The axis of ordinate represents the overall effective response/energy efficiency of the system in FIG. 18(*a*), and the count of servers that are active in FIG. 18(*b*). The system is run in a manner that puts importance to response at first, and switched in the middle (a point indicated by an arrow in each graph) to control that puts importance to energy efficiency. As a result, the response in the beginning takes a large value whereas the energy efficiency is not so high, and after the switch to the evaluation function that values energy efficiency more, the energy efficiency improves whereas the response drops. In other words, it has been confirmed that the switching of evaluation functions via the evaluation function switching unit has worked well. This embodiment also proves that, when there are a plurality of requirements (putting importance to response, putting importance to energy, and the like), too, the administrator only needs to instruct a suitable change of the system operation objective in order to change the operation of the system as necessary, without changing programs or processing. In short, this invention enables the system to operate effectively also when there are a plurality of requirements, and the effectiveness of this invention has been confirmed.

Fifth Embodiment

Figure 19:
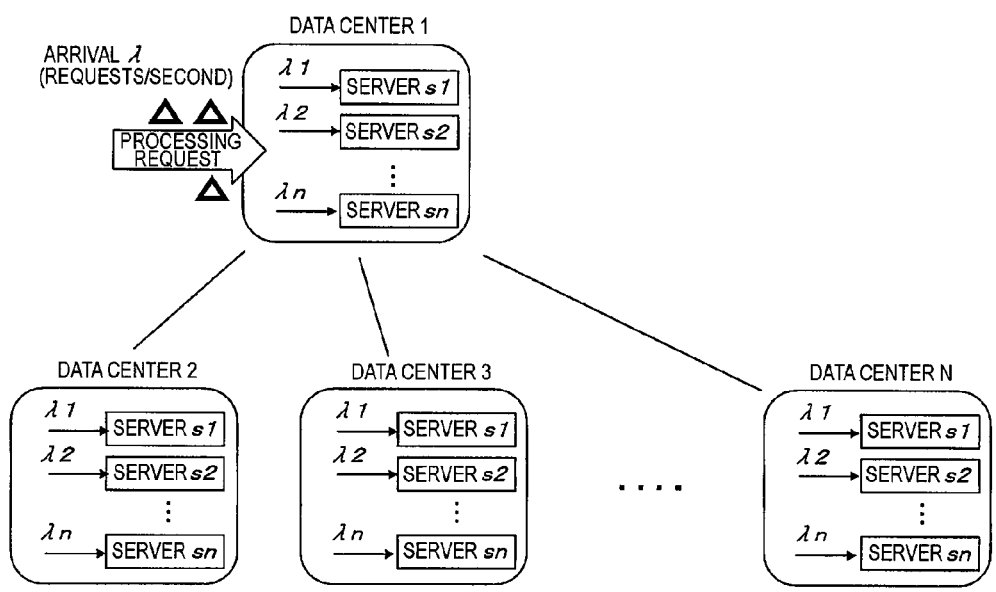
FIG. 19 is a schematic diagram of a system studied in a fifth embodiment of this invention.

Described in this embodiment is an example of load balancing among resources in which a plurality of data centers are connected by a network. The plurality of data centers each of which has the same configuration as the one in the second embodiment are coupled by a network to constitute a large-scale system illustrated in FIG. 19. A difference from the embodiments described above is that a delay due to the network cannot be ignored because resources are not closed off inside each data center. The difference means that, in the case of response/throughput, load balancing among resources needs to take into account the distance (delay) from a data center that issues processing requests (a data center that takes a main part in executing commanded processing) as well.

Control exerted in this embodiment puts importance to response. Specifically, an evaluation function similar to the one in the first embodiment is used for all resources. The distance (delay) from the data center that issues processing requests is taken into account by multiplying a normalized evaluation function by a coefficient:

$$\frac{1}{1+Dly} \quad (9)$$

in addition to multiplying by the performance coefficient $\alpha_i$ of components (resources) in each data center. The symbol Dly represents the amount of transmission delay from the data center that issues processing requests. The performance of each resource is thus recognized as relatively high in nearby data centers and as relatively low in distant data centers, with the result that the load is favorably balanced among resources over a network despite a delay caused by the network.

Figure 20:
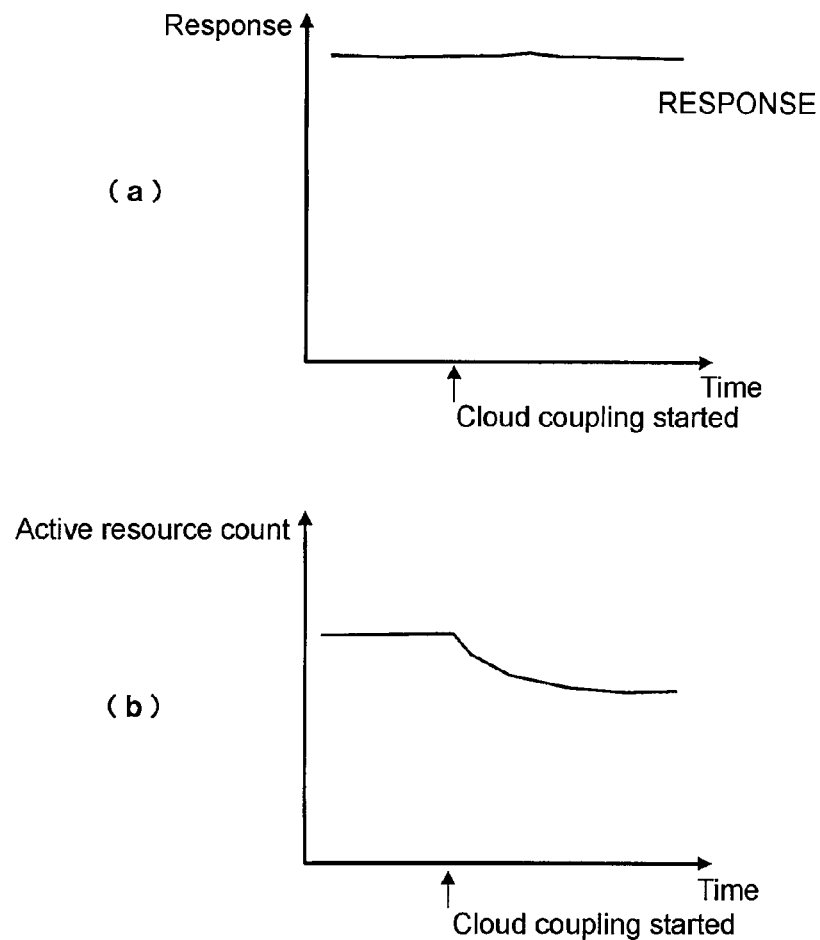
FIG. 20 includes (a) and (b) which are explanatory diagrams illustrating an experiment result in the fifth embodiment.

FIGS. 20(a) and 20(b) show results of an experiment conducted for the case described above in which a plurality of data centers are provided. The axis of abscissa represents time in each of the graphs. The axis of ordinate represents the overall effective response of the system in FIG. 20(a), and the count of servers that are active in FIG. 20(b). The experiment is about a case where many resources having distinctly superior processing performance are located near the data center that issues processing requests. This is the case where using resources of an external data center is expected to yield better results in various regards despite a delay due to the network. Processing is executed by a single data center up to a point indicated by an arrow in each graph. Past that point, the data center is coupled to the surrounding data centers via a network to be run in cooperation, and the resultant response and active server count have been observed. After the coupling, the former single data center serves as a data center that issues processing requests. The active server count is the count of active resources in all data centers that are coupled by the network. It can be seen in the graphs that, when the network couples data centers to one another, the system autonomously reduces the active resource count by operating so as to autonomously activate/shut down resources in search for resources that have superior processing performance, and to use the resources whose processing performance over the network is high while maintaining response performance. The effectiveness of this invention has been confirmed also for components (resources) that are coupled by a network having a delay. This invention can thus be used for the case where, for example, data centers that provide a cloud service are coupled to operate together as well. The use of this invention will have a great significance in the future discussion about coordination between clouds.

Sixth Embodiment

The foregoing embodiments deal with the balancing of load among resources related to processing such as response, throughput, and energy. However, this invention is applicable to other cases than this. Described here is an embodiment in which this invention is used for storage load balancing.

Figure 21:
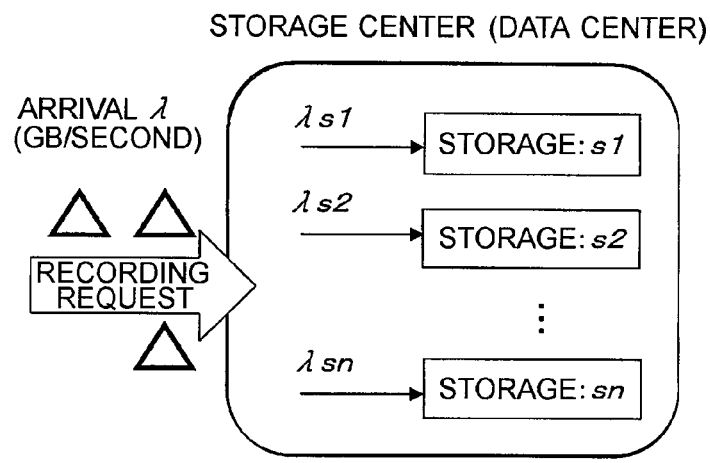
FIG. 21 is a schematic diagram of a system studied in a sixth embodiment of this invention.
Figure 22:
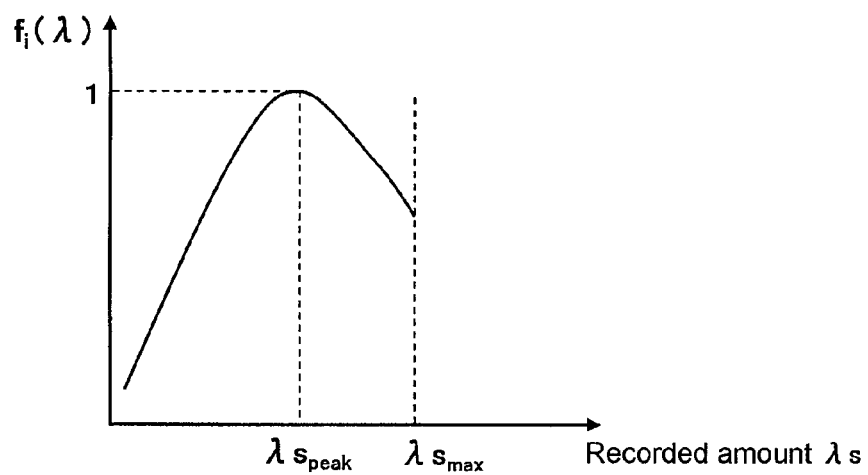
FIG. 22 is an explanatory diagram illustrating an example of an evaluation function that is used in the sixth embodiment.

FIG. 21 is a schematic diagram of a system that is used in this embodiment, and presents an image in which resources of the second embodiment are replaced by pieces of storage. Each piece of storage has the control system of this invention which is illustrated in FIG. 2 as a built-in component. In this case, too, how to set an evaluation function is an important point, and an evaluation function illustrated in FIG. 22 is used. In FIG. 22, the axis of abscissa represents a storage amount (recorded amount) $\lambda_S$. The axis of ordinate represents a normalized evaluation function, and this normalized evaluation function is multiplied by a coefficient $\alpha_{si}$, which is in proportion to the performance of storage. The performance in this case is determined by taking into account the recording speed, accessibility, archiving properties (keeping qualities), and the like. The system in this case may be controlled by changing only the coefficient $\alpha_{si}$ of each component to suit the situation such as aiming to enhance the recording speed or aiming to improve archiving properties. By changing the coefficient, the system moves data to a piece of storage that is suitable for a request. The high degree of freedom in setting an evaluation function is one of the great advantages of this invention.

Figure 23:
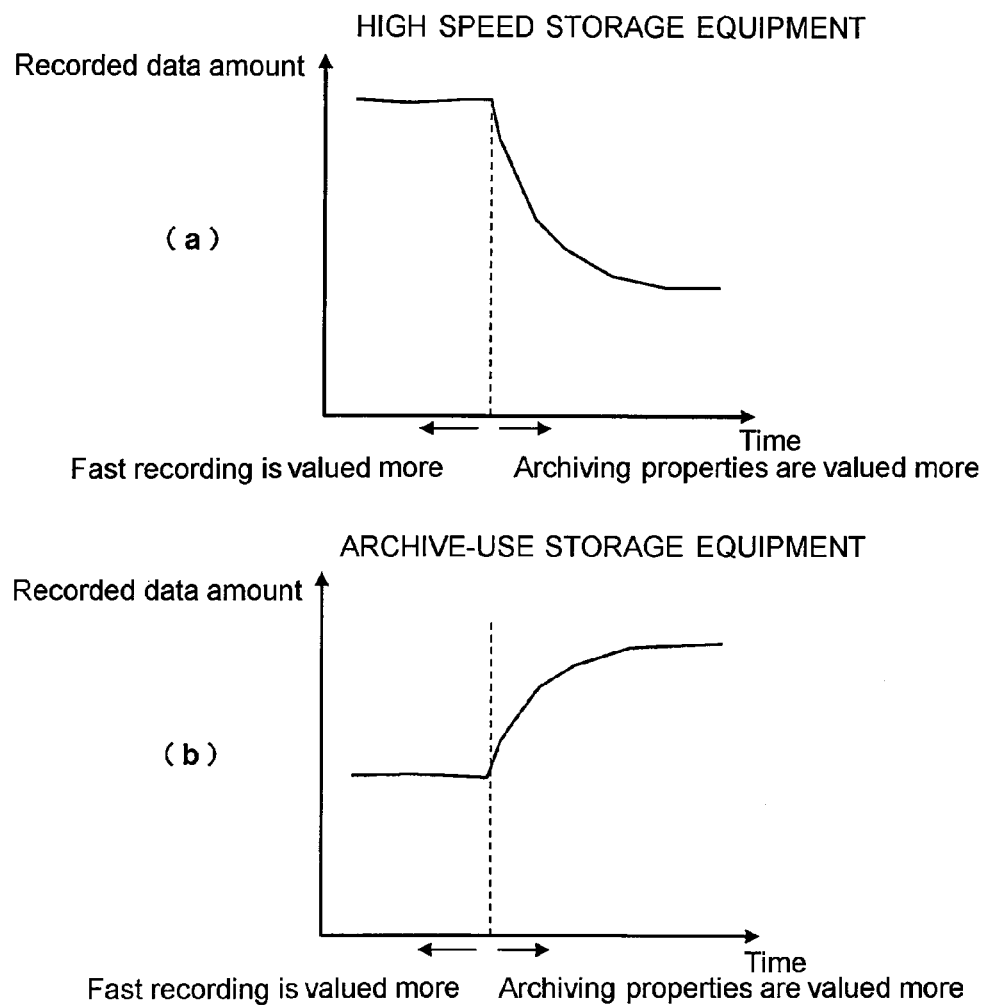
FIG. 23 includes (a) and (b) which are explanatory diagrams illustrating an experiment result in the sixth embodiment.

FIGS. 23(a) and 23(b) show results of an experiment conducted about the example of storage load balancing described above. In each of the graphs, the axis of abscissa represents time and the axis of ordinate represents the amount of data recorded in a piece of storage in question. This example shows results of monitoring one of pieces of storage that are high in recording speed and one of pieces of storage that are high in archiving properties. A switch has been made from an evaluation function for valuing high recording speed more to an evaluation function for valuing archiving properties more at a point indicated by an arrow in each graph. As can be seen in the graphs, the consumed capacity of the storage that is high in archiving properties increases past the arrow whereas the recorded amount of the storage that is high in recording speed decreases. In short, the system has autonomously realized the intent of the administrator. The invention of this application can thus be used in a similar manner in various fields where some (components) resources exist in relation to one another (are coupled by a network). This has been confirmed in the sixth embodiment.

Seventh Embodiment

Figure 24:
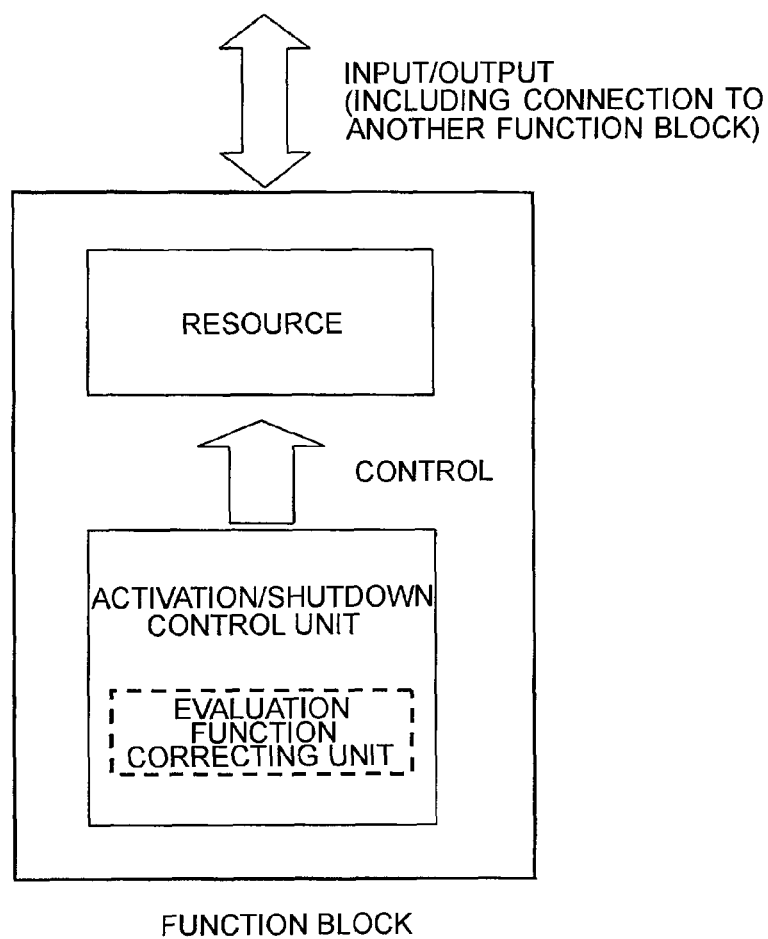
FIG. 24 is a schematic diagram of the architecture of a function block in a seventh embodiment of this invention.

The previous embodiments are configured so that the evaluation function is set in advance, or supplied, by an administrator. In other words, the evaluation function used reflects the subjectivities of a person and is rather fixed. Some of the embodiments also do not guarantee a complete quantitative match with an actual efficiency or the like. Described in this embodiment is a method of gradually and quantitatively bringing the evaluation function close to an actual phenomenon. The described method is for gradually changing an evaluation function about energy efficiency, which is an actually measurable amount, in line with reality. This embodiment is about energy efficiency and therefore has a system configuration similar to that of the third embodiment. An evaluation function correcting unit is newly provided as illustrated in FIG. 24.

Figure 25:
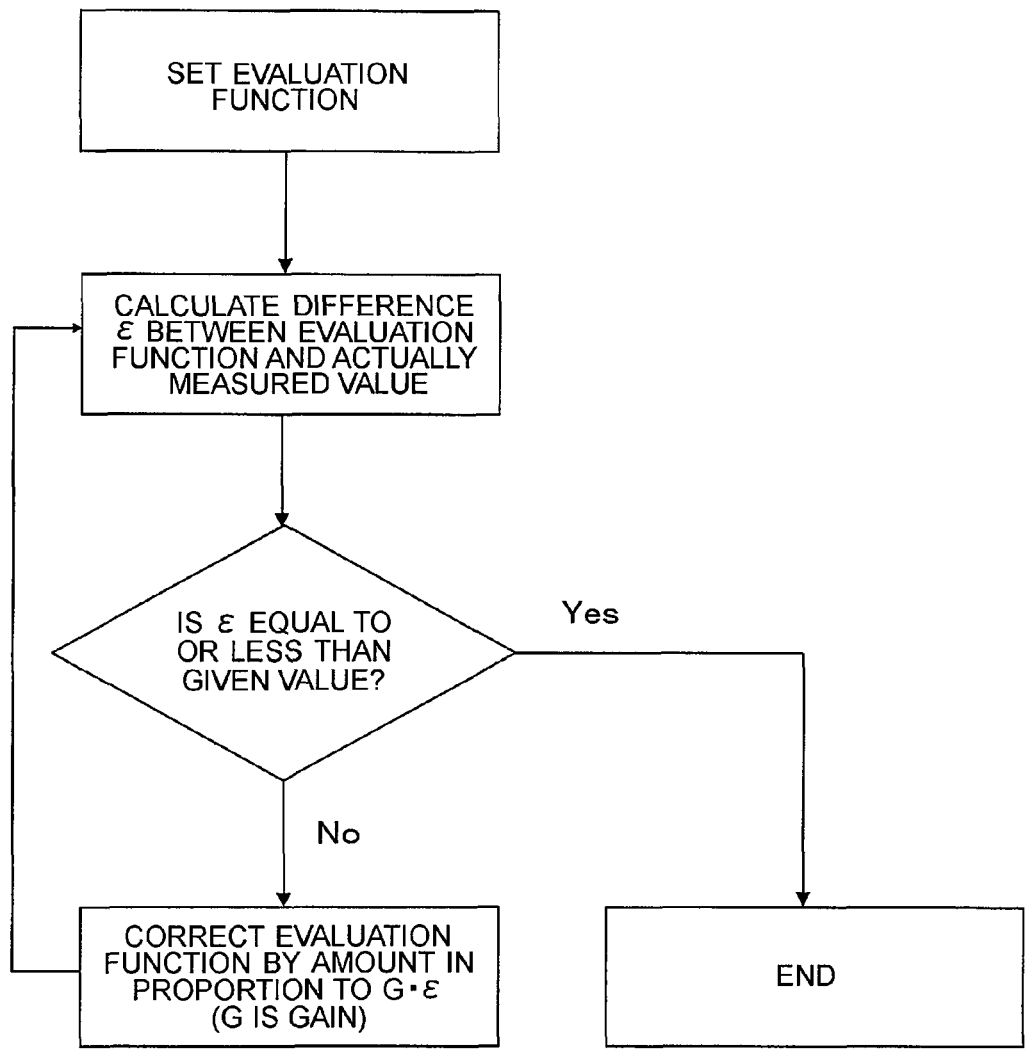
FIG. 25 is a flow chart illustrating the operation of a system studied in the seventh embodiment.

The system in this embodiment gradually and quantitatively corrects an evaluation function set to each resource into an accurate one. This is carried out through a process illustrated in FIG. 25. The method basically involves feeding back a value that is obtained by multiplying, by a coefficient, a difference between an initially set value of the evaluation function and a current and actually measured value. The evaluation function thus gradually takes a quantitatively correct value. This feedback process is executed by the evaluation function correcting unit, which is provided in each resource.

Figure 26:
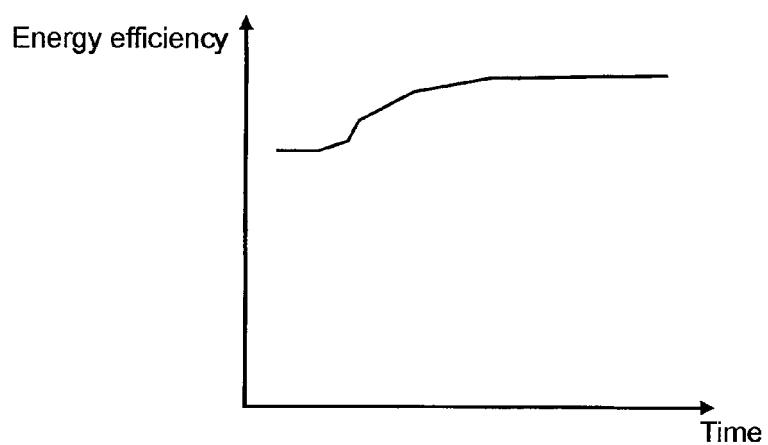
FIG. 26 is an explanatory diagram illustrating an experiment result in the seventh embodiment.

How energy efficiency shifts in the system described above is shown in FIG. 26. Conditions here are the same as those in the first embodiment, except that the evaluation function switching unit is mounted to each resource. The axis of abscissa represents time and the axis of ordinate represents energy efficiency in the graph. The graph shows that energy efficiency has improved with time. It has been proven that this invention allows a dynamic adjustment of an evaluation function as well.

In the above description, this invention has been described by using examples of the unit commitment problem of power generators, the load balancing in a data center (the activation/shutdown problem), and the storage load balancing (the unit commitment problem). However, this invention is not limited to the information field and the infrastructure field as already described, and can be used in a similar manner in various fields where some (components) resources exist in relation to one another (are coupled by a network).

The activation/shutdown control unit in the function blocks can be implemented by a combination of hardware and software. The units in the form of a combination of hardware and software operate as various means by deploying an activation/shutdown control program onto a RAM and running hardware such as a control unit (CPU) based on the program. The program may be recorded on a storage medium in a fixed manner to be distributed. The program recorded on the recording medium is read onto a memory via a cable, radio, or the recording medium itself, and runs the control unit and others. Examples of the recording medium include an optical disc, a magnetic disk, a semiconductor memory device, and a hard disk.

As has been described, according to one embodiment of this invention, the control method superior to existing control methods for the unit commitment problem in terms of robustness, following capability, upward/downward scalability, efficiency, and the like is provided, as well as the system that uses the control method.

Further, the specific configuration according to this invention is not limited to the embodiment mode and embodiments described above, and this invention encompasses changes made without departing from the gist of this invention.

This invention can contribute to control, in general, of a system that runs a plurality of function blocks by integrating the function blocks in an autonomous decentralized adaptive manner, and has tremendous industrial applicability. This invention accomplishes, easily and in a scalable manner, control for making the system robust against external disturbance and for adapting the system in real time in a manner that depends on the situation.

This application is based on and claims the benefit of priority from Japanese Patent Application No. 2011-187514 filed on Aug. 30, 2011, the disclosure of which is incorporated herein by reference in its entirety.

REFERENCE SIGNS LIST 100 function block
110 control object resource (power generator)
120 activation/shutdown control unit (activation/shutdown control means)

The invention claimed is:

1. A distributed autonomous system, comprising a plurality of correlated function blocks, for activating/shutting down the plurality of function blocks and executing load balancing among each resource of the plurality of function blocks, each of the plurality of function blocks being implemented by a combination of hardware and software, and
    wherein the plurality of function blocks, which are control objects, each include the resource and an activation/shutdown control unit to obtain and to store information of an evaluation function that indicates a performance index of its own function block and information of an evaluation function of another function block that has a relation to its own function block, and to determine whether to activate/shut down its own function block based on the evaluation function of its own function block and the evaluation function of the another function block that has a relation to its own function block, and
    wherein the activation/shutdown control unit determines whether to activate/shut down its own function block by using an amount relevant to the evaluation function of its own function block in a state where the evaluation function of its own function block takes a desired value, and using a state of the evaluation function of the another function block having a relation to its own function block that is equivalent to, or related to, the relevant amount.

2. The distributed autonomous system according to claim 1,
    wherein a convex or concave function is used as each of the evaluation functions, and
    wherein each of the plurality of function blocks determines operation settings including its own activation/shutdown, based on a value calculated from its own convex or concave function and a relevant convex or concave function.

3. The distributed autonomous system according to claim 1, wherein the activation/shutdown control unit determines whether to activate or shut down with a state where the evaluation function of its own function block takes a value "0" as a reference.

4. The distributed autonomous system according to claim 1, wherein the activation/shutdown control unit uses, as the amount relevant to the evaluation function of its own function block, a differential value that indicates a gradient state of the evaluation function of its own function block to determine operation settings including the activation/shutdown of its own function block.

5. The distributed autonomous system according to claim 1, wherein, when a state where the evaluation function of its own function block takes a value "0" is given as $\lambda_{0,i}$, a state where a differential value of the evaluation function of the another function block that has a relation to its own function block is equal to a differential value of the evaluation function at $\lambda_{0,i}$ is given as $z_{i,j}$, and a state of the another function block at that point is given as $\lambda_j$, the activation/ shutdown control unit determines activation/shutdown operation settings of its own function block with use of a following index:

$$S_i = \sum_{j \neq i}(\lambda j - z_{ij}) - \lambda_{0,i}.$$

6. The distributed autonomous system according to claim 5, wherein, of the plurality of function blocks, a function block that is currently shut down is activated with a value of the index (1) being 0 or more as a basis.

7. The distributed autonomous system according to claim 5, wherein, of the plurality of function blocks, a function block that is currently active is shut down with a value of the index (1) being less than 0 and this value being a smallest of evaluation function values of other function blocks that have a relation to the active function block as a basis.

8. The distributed autonomous system according to claim 1, further comprising an evaluation function switching unit for remotely setting, to each of the plurality of function blocks, the evaluation function of the each of the plurality of function blocks and/or the evaluation function of another function block that has a relation to the each of the plurality of function blocks.

9. The distributed autonomous system according to claim 1, wherein one or all of the plurality of function blocks comprises an evaluation function correcting unit for correcting an evaluation function that is set to its own function block by identifying a difference between a value that is calculated based on the set evaluation function and a current and actually measured value, and adding feedback so that the identified difference is eliminated.

10. A method of controlling a distributed autonomous system, the distributed autonomous system comprising a plurality of correlated function blocks which are control objects and which include respective resources, thereby activating/shutting down the plurality of function blocks and executing load balancing among each resource of the plurality of function blocks in an autonomous decentralized adaptive manner, each of the plurality of function blocks being implemented by a combination of hardware and software, and
the method comprising:
setting, to each of the plurality of function blocks, an evaluation function indicating a performance index that is associated with the each of the plurality of function blocks; and
executing activation/shutdown control, whether to activate/shut down the each of the plurality of function blocks based on an evaluation function of the each of the plurality of function blocks and an evaluation function of another function block that has a related function block,
wherein the activation/shutdown control which is executed for the each of the plurality of function blocks separately comprises determining whether to activate/shut down the each of the plurality of function blocks by using an amount relevant to the evaluation function of the each of the plurality of function blocks in a state where the evaluation function of the each of the plurality of function blocks takes a desired value, and using a state of the evaluation function of the another function block having a relation to the each of the plurality of function blocks that is equivalent to, or related to, the relevant amount.

11. The method of controlling the distributed autonomous system according to claim 10,
wherein a convex or concave function is used as each of the evaluation functions, and
wherein the method further comprises determining, by the each of the plurality of function blocks, operation settings including its own activation/shutdown, based on a value calculated from its own convex or concave function and a relevant convex or concave function.

12. The method of controlling the distributed autonomous system according to claim 10, wherein the activation/shutdown control which is executed for the each of the plurality of function blocks separately comprises determining whether to activate or shut down with a state where the evaluation function of the each of the plurality of function blocks takes a value "0" as a reference.

13. The method of controlling the distributed autonomous system according to claim 10, wherein the activation/shutdown control which is executed for the each of the plurality of function blocks separately comprises using, as the amount relevant to the evaluation function of the each of the plurality of function blocks, a differential value that indicates a gradient state of the evaluation function of the each of the plurality of function blocks to determine operation settings including the activation/shutdown of the each of the plurality of function blocks.

14. The method of controlling the distributed autonomous system according to claim 10, wherein, when a state where the evaluation function of the each of the plurality of function blocks takes a value "0" is given as $\lambda_{0,i}$, a state where a differential value of the evaluation function of the another function block that has a relation to the each of the plurality of function blocks is equal to a differential value of the evaluation function at $\lambda_{0,i}$ is given as $z_{i,j}$, and a state of the another function block at that point is given as $\lambda_j$, the activation/shutdown control which is executed for the each of the plurality of function blocks separately comprises determining the activation/shutdown operation settings of the each of the plurality of function blocks with use of a following index:

$$S_i = \sum_{j \neq i}(\lambda j - z_{ij}) - \lambda_{0,i}.$$

15. The method of controlling the distributed autonomous system according to claim 14, wherein, of the plurality of function blocks, a function block that is currently shut down is activated with a value of the index (2) being 0 or more as a basis.

16. The method of controlling the distribution autonomous system according to claim 14, wherein, of the plurality of function blocks, a function block that is currently active is shut down with a value of the index (2) being less than 0 and this value being a smallest of evaluation function values of other function blocks that have a relation to the active function block as a basis.

17. The method of controlling the distributed autonomous system according to claim 10, further comprising executing evaluation function switching processing of remotely setting, to the each of the plurality of function blocks, the evaluation function of the each of the plurality of function blocks and/or the evaluation function of another function block that has a relation to the each of the plurality of function blocks.

18. The method of controlling the distributed autonomous system according to claim 10, further comprising executing evaluation function correcting processing of correcting, by one or all of the plurality of function blocks, an evaluation function that is set to its own function block by identifying a difference between a value that is calculated based on the set evaluation function and a current and actually measured value, and adding feedback so that the identified difference is eliminated.

* * * * *

UNITED STATES PATENT AND TRADEMARK OFFICE
CERTIFICATE OF CORRECTION

PATENT NO. : 9,904,307 B2
APPLICATION NO. : 14/241936
DATED : February 27, 2018
INVENTOR(S) : Masatsugu Ogawa et al.

It is certified that error appears in the above-identified patent and that said Letters Patent is hereby corrected as shown below:

In the Specification

Column 16, Mode for Embodying the Invention, Line 59; Delete "$f_i(\lambda)$," and insert --$W(\lambda)$,-- therefor In the Claims Column 24, Line 53; In Claim 16, delete "distribution" and insert --distributed-- therefor Signed and Sealed this
Fourth Day of June, 2019

Andrei Iancu
*Director of the United States Patent and Trademark Office*